(12) United States Patent
Doornheim

(10) Patent No.: US 11,945,197 B2
(45) Date of Patent: Apr. 2, 2024

(54) MULTILAYER POLYLACTIDE BASED STRUCTURE AND ARTICLES MADE THEREFROM

(71) Applicant: TotalEnergies Corbion BV, Gorinchem (NL)

(72) Inventor: Martin Doornheim, Oude-Tonge (NL)

(73) Assignee: TOTALENERGIES CORBION CV, Corinchem (NL)

( * ) Notice: Subject to any disclaimer, the term of this patent is extended or adjusted under 35 U.S.C. 154(b) by 0 days.

(21) Appl. No.: 17/909,679

(22) PCT Filed: Mar. 5, 2021

(86) PCT No.: PCT/EP2021/055616
§ 371 (c)(1),
(2) Date: Sep. 6, 2022

(87) PCT Pub. No.: WO2021/176067
PCT Pub. Date: Sep. 10, 2021

(65) Prior Publication Data
US 2023/0119820 A1    Apr. 20, 2023

(30) Foreign Application Priority Data
Mar. 6, 2020 (EP) .................................. 20161419

(51) Int. Cl.
*B32B 27/08*    (2006.01)
*B32B 7/12*    (2006.01)
(Continued)

(52) U.S. Cl.
CPC ................ *B32B 27/08* (2013.01); *B32B 7/12* (2013.01); *B32B 27/18* (2013.01); *B32B 27/36* (2013.01);
(Continued)

(58) Field of Classification Search
None
See application file for complete search history.

(56) References Cited

U.S. PATENT DOCUMENTS

2019/0099991 A1*  4/2019  Zhou .................. B32B 27/08
2022/0282037 A1*  9/2022  Si ...................... B65D 75/008

FOREIGN PATENT DOCUMENTS

| JP | 2003305817 A | 10/2003 |
|----|--------------|---------|
| KR | 20110057500 A | 6/2011 |
| WO | 2015086463 A1 | 6/2015 |

OTHER PUBLICATIONS

PCT/EP2021/055616 International Search Report and Written Opinion dated May 11, 2021 (10 p.).

(Continued)

*Primary Examiner* — Ramsey Zacharia
(74) *Attorney, Agent, or Firm* — Amster, Rothstein & Ebenstein LLP

(57) ABSTRACT

The present invention relates to a multilayer structure, such as a film or a sheet, and articles made from such multilayer structures. The present invention provides a multilayer structure comprising at least three different layers A, B and C, wherein said layer B is disposed between said layer A and said layer C and is capable of binding said layer A to said layer C, wherein layer A comprises a polylactide (PLA) polymer, layer B comprises a lactide-rich poly(lactide-co-glycolide) (PLGA) polymer, and layer C comprises a polyglycolide (PGA) polymer and/or a glycolide-rich poly (lactide-co-glycolide) (PLGA) polymer. The present invention also provides a multilayer structure comprising at least one barrier layer, providing gas barrier properties, wherein said barrier layer comprises a glycolide-rich poly(lactide-co-glycolide) (PLGA) polymer.

16 Claims, 2 Drawing Sheets

Figure 1:
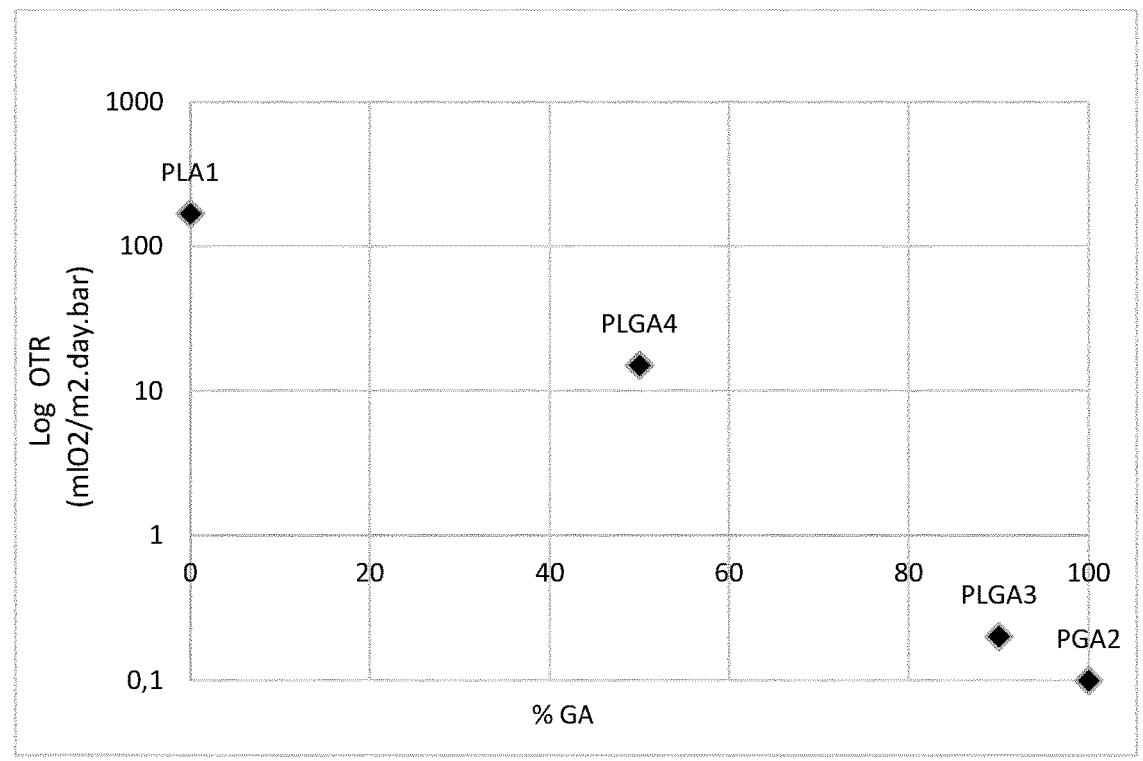

(51) Int. Cl.
  *B32B 27/18*    (2006.01)
  *B32B 27/36*    (2006.01)
(52) U.S. Cl.
  CPC ... *B32B 2250/244* (2013.01); *B32B 2307/516* (2013.01); *B32B 2307/518* (2013.01); *B32B 2307/7244* (2013.01); *B32B 2307/7246* (2013.01); *B32B 2553/00* (2013.01)

(56) References Cited

OTHER PUBLICATIONS

PCT/EP2021/055616 International Preliminary Report on Patentability dated Feb. 24, 2022 (18 p.).

* cited by examiner

MULTILAYER POLYLACTIDE BASED STRUCTURE AND ARTICLES MADE THEREFROM

CROSS-REFERENCE TO RELATED APPLICATIONS

This application claims the benefit of PCT/EP2021/055616 filed Mar. 5, 2021, which claims priority from EP20161419.5 filed Mar. 6, 2020, which is incorporated herein by reference in its entirety for all purposes.

FIELD OF THE INVENTION

The present invention relates to the technical field of multilayer structures such as films or sheets and articles made therefrom such as thermoformed articles. The present invention relates more in particular to a multilayer structure, which is based on the use of polylactide, in combination with other polymers derived from glycolide and/or lactide. The present invention further relates to articles made from a multilayer structure as defined herein, such as thermoformed articles or films.

BACKGROUND OF THE INVENTION

Packaging materials are generally used to protect and preserve products such as food products. Especially in the case of products with limited shelf-life, packaging materials are often required to possess adequate barrier properties e.g. from oxygen, water vapour or moisture, dust, etc. Keeping the contents clean, fresh, and safe for the intended shelf life is a primary function. Without an oxygen and/or moisture barrier, the food product or other product contained within the packaging may lose freshness, taste, colour, or may otherwise expire or become inedible or non-useable more quickly than products contained within packaging having such a barrier.

Multilayer structures such as films find many applications in the high-volume packaging industry including food and medical packaging. Such multilayer structures may include various layers ranging from e.g. 3 to 12 layers. The combination of several layers of different materials improves the mechanical and physical properties of the structure or film including puncture, tear and heat resistance. The combination of several layers also significantly increases shelf-life by controlling the transmission rate of oxygen, carbon dioxide and moisture as well as the concentration of oxygen, carbon dioxide, nitrogen and argon inside the package which is key in preserving the freshness of packaged products for longer period of time.

The most common polymers utilized in the flexible packaging industry are polyethylene (PE), polypropylene (PP), ethylene-vinyl alcohol (EVOH), polyamide (Nylon, PA), ionomers (EAA, EMAA), and ethylene vinyl acetate (EVA). Among these, polyethylene is the largest and cheapest packaging film. It is easy to process and is often combined with gas/aroma barriers such as ethylene-vinyl alcohol (EVOH) or polyvinyl alcohol (PVOH) and their respective copolymers.

In the last two decades, much attention has also been given to the development and application of biodegradable polymers. Aliphatic poly(ester)s have attracted much attention in this respect because of their highly desirable sustainable development, and they are being increasingly used in all areas of everyday life. These polymers have found a broad range of practical applications from packaging for industrial products to films in agriculture and represent, by far, the most used class of polymeric materials for biomedical application.

Currently, large-scale commercialization of poly(lactide) (PLA) has given a viable degradable alternative to the petrochemical-based polymers. PLA can be synthesized by ring-opening polymerization (ROP) of lactide, the cyclic dimer of lactic acid (LA) and through different enzymatic, cationic, anionic, or coordination-insertion polymerization mechanisms.

Currently available films made from PLA, and articles derived therefrom, present inadequate properties for certain applications. For instance, multilayer PLA films comprising barrier layer(s) including polymers such as EVOH or PVOH and their copolymers may lose their oxygen gas barrier properties under conditions of high relative humidity. A further drawback inherent in the prior art multilayer structures of biopolymer layers and other layers is that the internal bonding strength between the laminated layers is often unsatisfactory and insufficient to reliably hold together the individual material layers in a well-integrated laminate structure. Such delamination or loss of integrity is unacceptable during the service life of the multilayer film.

In view of the above, there remains a constant need in the art to improve the properties of multilayer structures and articles made therefrom, such as thermoformed articles, e.g. for use in packaging industry.

Accordingly, it is an object of the present invention to provide a multilayer structure and articles made therefrom. It is also an object of the invention to provide a multilayer structure and articles made therefrom, that may overcome at least some of the above mentioned drawbacks of known multilayer structures and articles.

It is another object of the invention to provide multilayer structures having well-defined properties, good appearance, and that can be easily made and easily processed into articles.

It is in particular an object of the invention to provide multilayer structures and articles made therefrom having excellent barrier properties, such as good oxygen gas barrier properties in particular.

It is also an object of the invention to provide multilayer structures and articles made therefrom, which do not suffer from delamination.

It is further an object of the invention to provide multilayer structures and articles made therefrom, which are recyclable and/or compostable.

It is a further object of the invention to provide a multilayer structure and articles made therefrom, which are based on polylactide (PLA).

SUMMARY OF THE INVENTION

It has now surprisingly been found that the above needs and objectives can be attained either individually or in any combination by a multilayer structure, in particular a multilayer polylactide based structure, such as a multilayer film or sheet as defined herein.

In particular, the present invention relates to a multilayer structure, such as a film or a sheet, comprising at least three different layers A, B and C, wherein said layer B is disposed between said layer A and said layer C and is capable of binding said layer A to said layer C, and wherein
 said layer A comprises a polylactide (PLA) polymer and optionally a nucleating agent, said layer B comprises a poly(lactide-co-glycolide) (PLGA) polymer having more than 30 mol % of lactide, and said layer C comprises a polyglycolide (PGA) polymer and/or a poly(lactide-co-glycolide) (PLGA) polymer having at most 30 mol % of lactide.

More in particular, the present invention provides a multilayer structure, wherein layer A is a base layer comprising PLA polymer, which layer may provide certain functional or mechanical properties to a multilayer structure and the article made therefrom as described herein.

The present invention provides a multilayer structure, wherein said layer B is a tie layer (an adhesive layer), being interposed between two layers A and C and capable of binding to said layers A and C in order to provide a laminated multilayer structure.

The present invention provides a multilayer structure, wherein said layer C is a barrier layer providing gas barrier properties, and preferably oxygen gas barrier properties.

In accordance with another aspect, the present invention also relates to a multilayer structure comprising at least one barrier layer providing gas barrier properties, and preferably a barrier layer providing oxygen gas barrier properties, wherein said barrier layer comprises a poly(lactide-co-glycolide) (PLGA) polymer having at most 30 mol % of lactide, and preferably comprising from 40 to 100 wt % of a poly(lactide-co-glycolide) (PLGA) polymer having at most 30 mol % of lactide.

In accordance with the present invention, a multilayer structure is provided that shows excellent gas barrier properties. The inventors have shown that excellent barrier properties against gasses such as oxygen can be obtained when a barrier layer that comprises a PLGA polymer is applied in a multilayer structure, and in particular a barrier layer that comprises a PLGA polymer which is rich in glycolide, i.e. a PLGA polymer that comprises lactide in an amount of at most 30 mol %. Surprisingly, it was shown that a layer comprising a glycolide-rich PLGA polymer as defined herein permits to provide good oxygen gas barrier properties to a multilayer structure comprising said layer. The present invention therefore also surprisingly shows that the use of a PLGA polymer as described herein, i.e. PLGA having at most 30 mol % of lactide, as a gas barrier resin, preferably as oxygen gas barrier resin, in a layer of a multilayer structure is particularly advantageous.

In another aspect, the present invention relates to a multilayer structure comprising at least one barrier layer providing gas barrier properties, and preferably a barrier layer providing oxygen gas barrier properties, wherein said barrier layer comprises a poly(lactide-co-glycolide) (PLGA) polymer having at most 30 mol % of lactide, and wherein said multilayer structure preferably comprises at least three different layers A, B and C, wherein said at least one barrier layer corresponds to said layer C, and wherein said layers A, B and C are as defined herein.

The present invention provides in another aspect for the use of a poly(lactide-co-glycolide) (PLGA) polymer having at most 30 mol % of lactide as defined herein, and preferably having from 2 to 30 mol % lactide, and preferably from 5 to 25 mol % lactide, and more preferably from 5 to 15 mol % lactide, and more preferably from 9 to 14 mol % lactide, as a gas barrier resin, preferably as oxygen gas barrier resin, in a layer of a multilayer structure, preferably in a barrier layer of a multilayer structure.

Another advantageous characteristic of a multilayer structure as provided in the present invention is that delamination effects of the structure can be greatly reduced, or even excluded. The inventors have shown that less delamination is obtained when a tie layer (layer B herein) is applied as an intermediate layer in-between two adjacent layers in said multilayer structure, and when said tie layer comprises a PLGA polymer which is rich in lactide, i.e. a PLGA polymer that comprises lactide in an amount of more than 30 mol %. Using a layer comprising PLGA polymers having the above indicated amount of more than 30 mol % of lactide, as a tie or adhesive layer in a multilayer structure unexpectedly provides an integral multilayer structure that avoids or at least significantly reduces delamination effects. The present invention therefore also surprisingly shows that the use of a lactide-rich PLGA polymer as described herein, i.e. PLGA having more than 30 mol % of lactide, as an adhesive resin in a tie layer of a multilayer structure is particularly advantageous.

The present invention provides in another aspect for the use of a poly(lactide-co-glycolide) (PLGA) polymer having more than 30 mol % lactide as defined herein, and preferably having from 35 to 75 mol % lactide, and preferably from 38 to 70 mol % lactide, and more preferably from 40 to 60 mol % lactide, and more preferably from 45 to 55 mol % lactide, as an adhesive (tie) resin in a layer of a multilayer structure, preferably in a tie layer of a multilayer structure.

A multilayer PLA structure as defined herein further has the important (end-of-life) advantage that at least one and preferably all layers in said structure are compostable, for example according to the European norm EN13432, or are chemically recyclable. The polymers applied in layers of the herein described multilayer structures can be degraded biologically (i.e. composted) into water and carbon dioxide or chemically recycled into their corresponding monomers. The monomers formed in the latter process can be separated, purified and reused in a polymerization process to make new polymers.

It has thus been found that it is possible to provide a multilayer structure that overcomes at least some of the above mentioned drawbacks. The multilayer structures such as films or sheets according to the present invention show excellent properties, including a good balance in mechanical, optical and functional properties, notably good gas barrier properties. Moreover, multilayer structures as described herein are easy to process into various types of articles, and are compostable and/or chemically recyclable.

In another aspect, the invention therefore also relates to an article made from a multilayer structure according to the present invention. In an embodiment, the invention provides an article, made from a multilayer structure according to the present invention, which may include a film, a sheet, a laminate. Such film, sheet or laminate may be oriented or non-oriented, and may for instance be a cast film, an uniaxially oriented film or biaxially oriented film. In an embodiment the invention provides an article made from a multilayer structure according to the present invention, which may include a thermoformed article, an injection moulded article, an article made by injection stretch blow moulding, or an article made by extrusion blow moulding. Non-limiting examples of articles according to the invention include for instance a bag, a pouch, a container, a box, a cup, a tray, a bottle, a lidding film.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention.

DETAILED DESCRIPTION OF THE DRAWINGS

FIG. 1 represents oxygen transmission rate values (OTR) as determined for sheets made from PLA, PGA, and two PLGA polymers having different glycolide:lactide molar ratios. The figure illustrates OTR values, as corrected for a 100 μm sheet thickness, as a function of the percentage of glycolic acid in the applied polymers, and hence illustrates an effect of glycolide content on oxygen transmission through the sheet.

Figure 2:
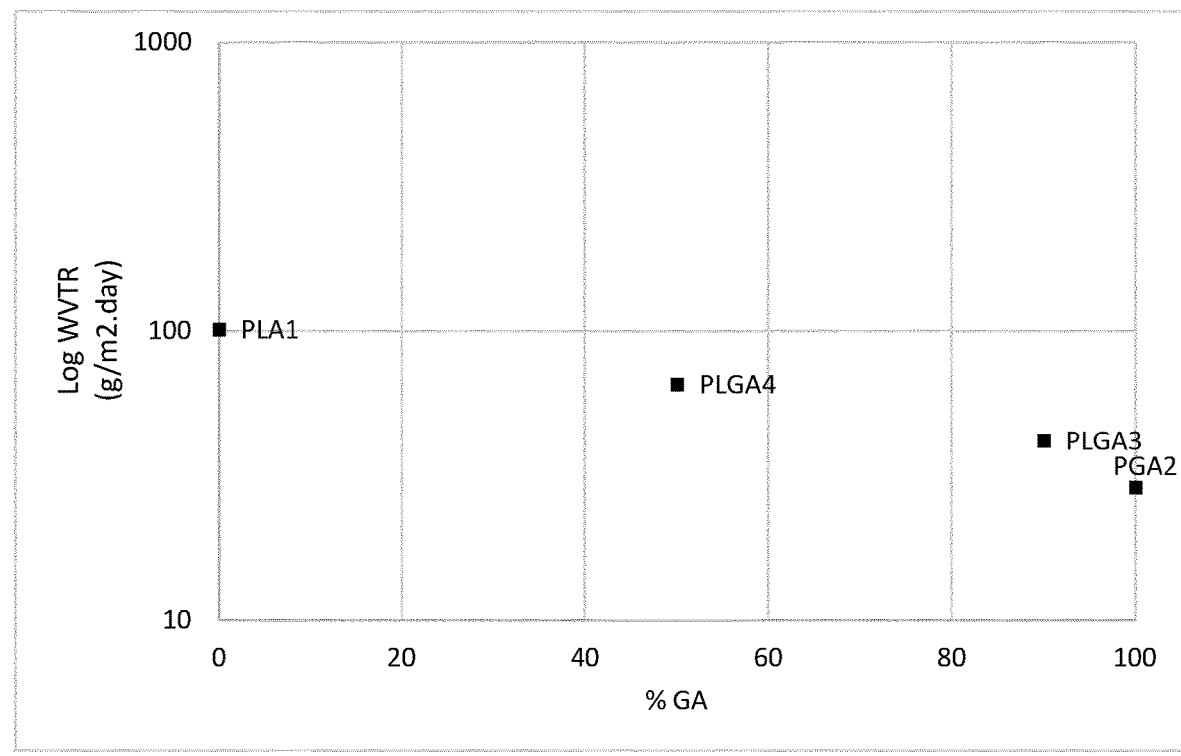

FIG. 2 represents water vapour transmission rate values (WVTR) as determined for sheets made from PLA, PGA, and two PLGA polymers having different glycolide:lactide molar ratios. The figure illustrates WVTR values, as corrected for a 100 μm sheet thickness, as a function of the percentage of glycolic acid in the applied polymers, and hence illustrates an effect of glycolide content on water vapour transmission through the sheet.

Figure 3A:
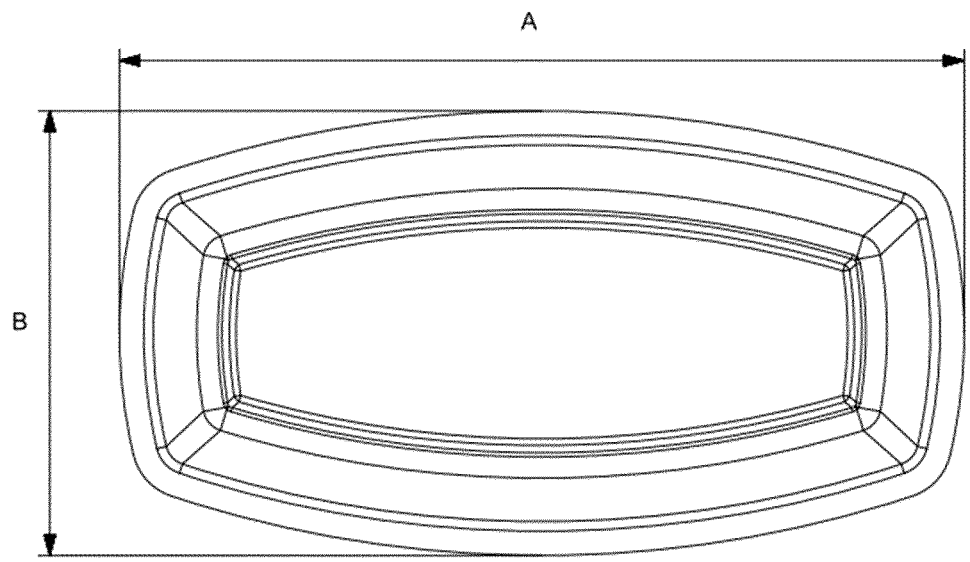
Figure 3B:
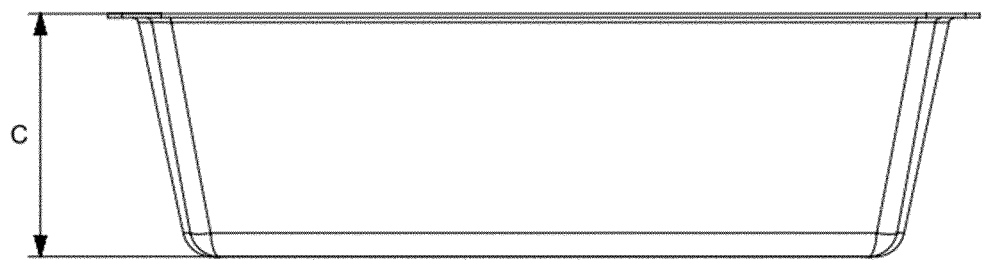
Figure 3C:
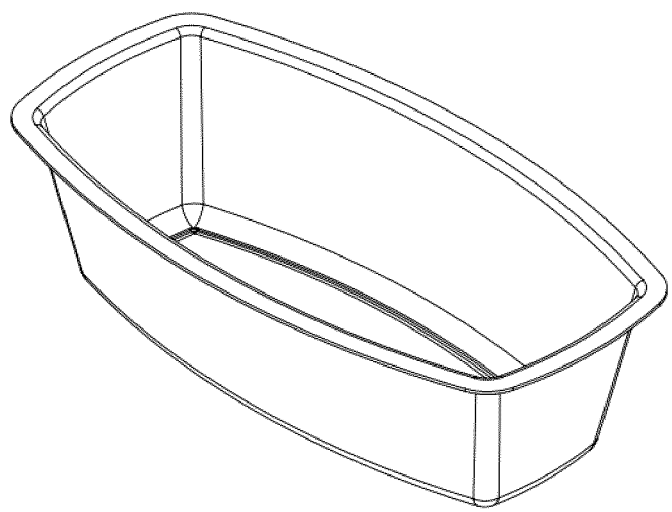

FIGS. 3A-C represent an embodiment of a thermoformed article which can be made from a multilayer structure according to the invention: FIG. 3A represents a top view, FIG. 3B represents a side view, and FIG. 3c represents a 3D view of said thermoformed article.

DETAILED DESCRIPTION OF THE INVENTION

When describing the invention, the terms used are to be construed in accordance with the following definitions, unless a context dictates otherwise.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used in the specification and the appended claims, the singular forms "a", "an," and "the" include plural referents unless the context clearly dictates otherwise. By way of example, "a step" means one step or more than one step.

Unless defined otherwise, all technical and scientific terms used herein have the same meaning as is commonly understood by one of skill in the art. All publications referenced herein are incorporated by reference thereto.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

The term "about" as used herein when referring to a measurable value such as a parameter, an amount, a temporal duration, and the like, is meant to encompass variations of +/−10% or less, preferably +/−5% or less, more preferably +/−1% or less, of and from the specified value, insofar such variations are appropriate to perform in the disclosed invention. It is to be understood that the value to which the modifier "about" refers is itself also specifically, and preferably, disclosed.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded, and that the substitution results in a chemically stable compound. Where groups can be substituted, such groups may be substituted with one or more, and preferably one, two or three substituents.

The terms described above and others used in the specification are well understood to those skilled in the art. Preferred statements (features) and embodiments of the processes, formulations and uses of this invention are set herein below. Each statement and embodiment of the invention so defined may be combined with any other statement and/or embodiment unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered statements and embodiments, with any other aspect and/or embodiment.

1. A multilayer structure, such as a film or a sheet, comprising at least three different layers A, B and C, wherein said layer B is disposed between said layer A and said layer C and is capable of binding said layer A to said layer C, and wherein
said layer A comprises a polylactide (PLA) polymer and optionally a nucleating agent,
said layer B comprises a poly(lactide-co-glycolide) (PLGA) polymer having more than 30 mol % of lactide, and
said layer C comprises a polyglycolide (PGA) polymer and/or a poly(lactide-co-glycolide) (PLGA) polymer having at most 30 mol % of lactide.

2. A multilayer structure, such as a film or a sheet, comprising at least three different layers A, B and C, wherein said layer B is disposed between said layer A and said layer C and is capable of binding said layer A to said layer C, and wherein
said layer A comprises a polylactide (PLA) polymer and optionally a nucleating agent,
said layer B comprises a poly(lactide-co-glycolide) (PLGA) polymer having more than 30 mol % of lactide, and
said layer C comprises a poly(lactide-co-glycolide) (PLGA) polymer having at most 30 mol % of lactide.
3. Multilayer structure according to statement 1 or 2, wherein said layer A comprises from 50 to 100 wt %, or from 55 to 100 wt %, or from 60 to 100 wt %, or from 60 to 100 wt %, or from 65 to 100 wt %, or from 70 to 100 wt %, or from 75 to 100 wt %, or from 80 to 100 wt %, or from 85 to 100 wt %, or from 90 to 100 wt %, or from 95 to 100 wt % of a PLA polymer, based on the total weight of the layer.
4. Multilayer structure according to any of statements 1 to 3, wherein said layer A comprises up to 15 wt %, preferably up to 10 wt % of a nucleating agent, preferably up to 5 wt % of a nucleating agent, based on the total weight of the layer.
5. Multilayer structure according to any of statements 1 to 4, wherein said PLA polymer is a polymer of a lactide monomer, wherein said lactide monomer is selected from the group comprising L-lactide, D-lactide, meso-lactide, and any mixtures thereof.
6. Multilayer structure according to any of statements 1 or 5, wherein said PLA polymer is selected from the group comprising poly(L-lactic acid) (PLLA), poly(D-lactic acid) (PDLA), poly(L-, D-lactic acid) (PLDLA), and any mixtures thereof.
7. Multilayer structure according to any of statements 1 to 4, wherein said PLA polymer is a PLA copolymer of lactide monomer and a non-lactide comonomer selected from the group comprising urethanes, carbonates and lactones, wherein said lactones are preferably selected from the group comprising caprolactone, valerolactone, and butyrolactone.
8. Multilayer structure according to statement 7, wherein the amount of said non-lactide comonomer is at most 30 wt % based on the total weight of the PLA copolymer, such as comprised between 1 and 30 wt %, or between 1 and 20 wt %, or between 1 and 10 wt %, or between 2 and 7 wt %, or between 2 and 5 wt %, based on the total weight of the PLA copolymer.
9. Multilayer structure according to any of statements 1 to 8, wherein said layer A further comprises one or more polymers different from PLA, and preferably selected from the group comprising polycaprolactone (PCL), polybutylene succinate (PBS), polybutylene adipate (PBA), polybutylene succinate adipate (PBSA), polyhydroxyalkanoates (PHA), polybutylene adipate terephtalate (PBAT), thermoplastic starch (TPS) and non-thermoplastic starch (TPS).
10. Multilayer structure according to any of statements 1 to 9, wherein the total amount of polymers different from PLA comprised in layer A is lower than 50 wt % based on the total weight of the layer A, and preferably lower than 40 wt %, lower than 30 wt %, lower than 25 wt %, lower than 20 wt %, lower than 15 wt %, lower than 10 wt %, or lower than 5 wt %, based on the total weight of the layer A.
11. Multilayer structure according to any of statements 1 to 10, wherein said layer B comprises from 50 to 100 wt %, or from 55 to 100 wt %, or from 60 to 100 wt %, or from 65 to 100 wt %, or from 70 to 100 wt %, or from 75 to 100 wt %, or from 80 to 100 wt %, or from 85 to 100 wt %, or from 90 to 100 wt %, or from 95 to 100 wt % of said PLGA polymer.
12. Multilayer structure according to any of statements 1 to 11, wherein said layer B comprises a PLGA polymer having from 35 to 75 mol % lactide, and preferably having from 38 to 70 mol % lactide, and more preferably from 40 to 60 mol % lactide, and more preferably from 45 to 55 mol % lactide.
13. Multilayer structure according to any of the statements 1 and 3 to 12, wherein said layer C comprises from 40 to 100 wt %, or from 50 to 100 wt %, or from 55 to 100 wt %, or from 60 to 100 wt %, or from 65 to 100 wt %, or from 70 to 100 wt %, or from 75 to 100 wt %, or from 80 to 100 wt %, or from 85 to 100 wt %, or from 90 to 100 wt %, or from 95 to 100 wt % of the PGA polymer.
14. Multilayer structure according to any of the statements 1 to 13, wherein said layer C comprises from 40 to 100 wt %, or from 50 to 100 wt %, or from 55 to 100 wt %, or from 60 to 100 wt %, or from 65 to 100 wt %, or from 70 to 100 wt %, or from 75 to 100 wt %, or from 80 to 100 wt %, or from 85 to 100 wt %, or from 90 to 100 wt %, or from 95 to 100 wt % of the PLGA polymer.
15. Multilayer structure according to any of statements 1 to 14, wherein said layer C comprises a PLGA polymer having from 2 to 30 mol % lactide, and preferably from 5 to 25 mol % lactide, and more preferably from 5 to 15 mol % lactide, and more preferably from 9 to 14 mol % lactide.
16. Multilayer structure according to any of statements 1 to 15, wherein said layer C is a barrier layer providing gas barrier properties, and preferably oxygen gas barrier properties.
17. Multilayer structure according to any of statements 1 and 3 to 16, wherein
said layer A comprises from 50 to 100 wt %, preferably from 60 to 100 wt %, more preferably from 75 to 100 wt %, or even more preferably from 85 to 100 wt % or from 90 to 100 wt % or from 95 to 100 wt % of said polylactide (PLA) polymer, preferably selected from the group comprising poly(L-lactic acid) (PLLA), poly(D-lactic acid) (PDLA), poly(L-,D-lactic acid) (PLDLA), and any mixtures thereof; and from 0 to 15 wt %, preferably from 0 to 10 wt % of a nucleating agent, preferably from 0 to 5 wt % of a nucleating agent, and
said layer B comprises from 50 to 100 wt %, preferably from 60 to 100 wt %, more preferably from 75 to 100 wt %, or even more preferably from 85 to 100 wt % or from 90 to 100 wt % or from 95 to 100 wt % of said poly(lactide-co-glycolide) (PLGA) polymer having more than 30 mol % of lactide, and preferably having from 35 to 75 mol % lactide, and preferably having from 38 to 70 mol % lactide, and more preferably from 40 to 60 mol % lactide, and more preferably from 45 to 55 mol % lactide, and
said layer C comprises
from 40 to 100 wt %, or from 50 to 100 wt %, or from 60 to 100 wt %, or from 75 to 100 wt %, or from 85 to 100 wt %, or from 90 to 100 wt %, or from 95 to 100 wt % of said polyglycolide (PGA) polymer and/or from 40 to 100 wt %, or from 50 to 100 wt %, or from 60 to 100 wt %, or from 75 to 100 wt %, or from 85 to 100 wt %, or from 90 to 100 wt %, or from 95 to 100 wt % of said poly(lactide-co-glycolide) (PLGA) polymer having at most 30 mol % of lactide, and preferably having from 2 to 30 mol % lactide, and preferably from 5 to 25 mol % lactide, and more preferably from 5 to 15 mol % lactide and more preferably from 9 to 14 mol % lactide.

18. Multilayer structure according to statement 17, wherein said layer A further comprises one or more polymers different from PLA, and preferably selected from the group comprising polycaprolactone (PCL), polybutylene succinate (PBS), polybutylene adipate (PBA), polybutylene succinate adipate (PBSA), polyhydroxyalkanoates (PHA), polybutylene adipate terephtalate (PBAT), thermoplastic starch (TPS) and non-thermoplastic starch (TPS), and wherein the total amount of polymers different from PLA comprised in layer A is lower than 50 wt % based on the total weight of the layer A, and preferably lower than 40 wt %, lower than 30 wt %, lower than 25 wt %, lower than 20 wt %, lower than 15 wt %, lower than 10 wt %, or lower than 5 wt %, based on the total weight of the layer A.

19. Multilayer structure according to any of statements 2 to 16, wherein said layer A comprises from 50 to 100 wt %, preferably from 60 to 100 wt %, more preferably from 75 to 100 wt %, or even more preferably from 80 to 100 wt % or from 85 to 100 wt % or from 90 to 100 wt % or from 95 to 100 wt % based on the total weight of the layer, of said polylactide (PLA) polymer, preferably selected from the group comprising poly(L-lactic acid) (PLLA), poly(D-lactic acid) (PDLA), poly(L-,D-lactic acid) (PLDLA), and any mixtures thereof; and from 0 to 15 wt %, preferably from 0 to 10 wt % or from 0 to 5 wt % of a nucleating agent, and said layer B comprises from 50 to 100 wt %, preferably from 60 to 100 wt %, more preferably from 75 to 100 wt %, or even more preferably from 80 to 100 wt %, or from 85 to 100 wt % or from 90 to 100 wt % or from 95 to 100 wt % based on the total weight of the layer, of said poly(lactide-co-glycolide) (PLGA) polymer having more than 30 mol % of lactide, and preferably having from 35 to 75 mol % lactide, and preferably from 38 to 70 mol % lactide, and more preferably from 40 to 60 mol % lactide, and more preferably from 45 to 55 mol % lactide, and said layer C comprises from 40 to 100 wt %, or from 50 to 100 wt %, or from 60 to 100 wt %, or from 75 to 100 wt %, or from 80 to 100 wt %, or from 85 to 100 wt %, or from 90 to 100 wt %, or from 95 to 100 wt % based on the total weight of the layer, of said poly(lactide-co-glycolide) (PLGA) polymer having at most 30 mol % of lactide, and preferably having from 2 to 30 mol % lactide, and preferably from 5 to 25 mol % lactide, and more preferably from 5 to 15 mol % lactide and more preferably from 9 to 14 mol % lactide.

20. Multilayer structure according to statement 19, wherein said layer A further comprises one or more polymers different from PLA, and preferably selected from the group comprising polycaprolactone (PCL), polybutylene succinate (PBS), polybutylene adipate (PBA), polybutylene succinate adipate (PBSA), polyhydroxyalkanoates (PHA), polybutylene adipate terephtalate (PBAT), thermoplastic starch (TPS) and non-thermoplastic starch (TPS), and wherein the total amount of polymers different from PLA comprised in layer A is lower than 50 wt % based on the total weight of the layer A, and preferably lower than 40 wt %, lower than 30 wt %, lower than 25 wt %, lower than 20 wt %, lower than 15 wt %, lower than 10 wt %, or lower than 5 wt %, based on the total weight of the layer A.

21. Multilayer structure according to any of the statements 1 to 20 wherein at least one, and preferably all layers in said structure are compostable or chemically recyclable.

22. A multilayer structure comprising at least one barrier layer, preferably a barrier layer providing gas barrier properties, and more preferably a barrier layer providing oxygen gas barrier properties, wherein said barrier layer comprises a poly(lactide-co-glycolide) (PLGA) polymer having at most 30 mol % of lactide.

23. Multilayer structure according to statement 22, wherein said barrier layer comprises from 40 to 100 wt %, or from 50 to 100 wt %, or from 60 to 100 wt %, or from 75 to 100 wt %, or from 85 to 100 wt %, or from 90 to 100 wt %, or from 95 to 100 wt % based on the total weight of the layer of said PLGA polymer.

24. Multilayer structure according to any of statements 22 to 23, wherein said barrier layer comprises a PLGA polymer having from 2 to 30 mol % lactide, and preferably from 5 to 25 mol % lactide, and more preferably from 5 to 15 mol % lactide, and more preferably from 9 to 14 mol % lactide.

25. A multilayer structure according to any of statements 22 to 24, wherein said barrier layer comprises more than 90 wt %, and preferably from 95 to 100 wt % based on the total weight of the layer, of said poly(lactide-co-glycolide) (PLGA) polymer having from 5 to 15 mol % lactide, and preferably from 9 to 14 mol % lactide.

26. A multilayer structure according to any of statements 22 to 25, wherein said multilayer structure comprises at least three different layers A, B and C and wherein said at least one barrier layer providing gas barrier properties corresponds to said layer C, wherein said layer B is disposed between said layer A and said layer C and is capable of binding said layer A to said layer C, wherein said layer A comprises a polylactide (PLA) polymer and optionally a nucleating agent, and wherein said layer B comprises a poly(lactide-co-glycolide) (PLGA) polymer having more than 30 mol % of lactide, and wherein said layer C optionally further comprises a polyglycolide (PGA) polymer.

27. A multilayer structure according to any of statements 22 to 26, wherein said multilayer structure comprises at least three different layers A, B and C, wherein said at least one barrier layer corresponds to said layer C, and wherein said layers A, B and C are as defined in any one of statements 1 to 21.

28. Multilayer structure according to any of statements 22 to 27 wherein said barrier layer is compostable or chemically recyclable.

29. Multilayer structure according to any of statements 1 to 28, wherein said multilayer structure is a film or a sheet, such as a cast film or a blown film.
30. Multilayer structure according to any of statements 1 to 29, wherein said multilayer structure has a thickness comprised between 10 and 1500 µm, preferably between 10 and 750 µm.
31. Multilayer structure according to any of statements 1 to 30, wherein said structure is obtained by co-extrusion, coating, extrusion coating, lamination and any combination thereof.
32. Process for preparing a multilayer structure according to any of the statements 1 to 31, wherein said process is selected from the group comprising co-extrusion, coating, extrusion coating, lamination and any combination thereof.
33. Article made from a multilayer structure according to any of statements 1 to 31.
34. Article according to statement 33, wherein said article is selected from the group comprising a film, a sheet, and a laminate, and preferably is a blown film or a cast film, or an uniaxially oriented or biaxially oriented film.
35. Article according to statement 33, wherein said article is a thermoformed article, an injection moulded article, an article made by injection stretch blow moulding, an article made by extrusion blow moulding.
36. Article according to any of statements 33 to 35, wherein said article is a packaging material, such as a bag, a pouch, a container, a box, a cup, a tray, a bottle, a lidding film.
37. Use of a poly(lactide-co-glycolide) (PLGA) polymer having more than 30 mol % lactide, and preferably having from 35 to 75 mol % lactide, and preferably from 38 to 70 mol % lactide, and more preferably from 40 to 60 mol % lactide, and more preferably from 45 to 55 mol % lactide, as an adhesive resin in a layer of a multilayer structure, preferably in a tie layer of a multilayer structure.
38. Use according to statement 37, wherein said PLGA polymer is used in layer, preferably a tie layer, of a multilayer structure in an amount from 50 to 100 wt %, or from 55 to 100 wt %, or from 60 to 100 wt %, or from 65 to 100 wt %, or from 70 to 100 wt %, or from 75 to 100 wt %, or from 80 to 100 wt %, or from 85 to 100 wt %, or from 90 to 100 wt %, or from 95 to 100 wt % based on the total weight of said layer.
39. Use of a poly(lactide-co-glycolide) (PLGA) polymer having at most 30 mol % of lactide, and preferably having from 2 to 30 mol % lactide, and preferably from 5 to 25 mol % lactide, and more preferably from 5 to 15 mol % lactide and more preferably from 9 to 14 mol % lactide, as a gas barrier resin, preferably as oxygen barrier resin, in a layer of a multilayer structure, preferably in a barrier layer of a multilayer structure.
40. Use according to statement 39, wherein said PLGA polymer is used in a layer, preferably a barrier layer, of a multilayer structure in an amount from 40 to 100 wt %, or from 50 to 100 wt %, %, or from 55 to 100 wt %, or from 60 to 100 wt %, or from 65 to 100 wt %, or from 70 to 100 wt %, or from 75 to 100 wt %, or from 80 to 100 wt %, or from 85 to 100 wt %, or from 90 to 100 wt %, or from 95 to 100 wt % based on the total weight of said layer.

The present invention is based on the surprising finding that a multilayer can be obtained showing good processing behavior, excellent gas barrier properties, such as high oxygen gas barrier properties, and good lamination properties (delamination effects are minimized or even eliminated), when using polymers that are based on polylactide and polymers that are derived from glycolide and/or lactide, such as polyglycolide (PGA) and/or poly(glycolide-co-lactide) (PLGA).

The inventors have further shown that by careful design of the properties of poly(glycolide-co-lactide) (PLGA) polymers, e.g. by adjusting their glycolide/lactide ratio, PLGA polymers having specific properties are obtained that are particularly advantageous for application in certain layers of a multilayer structure as defined herein.

Hereunder, particularities and properties of the different layers making up a multilayer structure according to the invention and the polymers applied therein will be discussed in more detail.

Multilayer Structure

The present invention provides multilayer structures. A "multilayer structure" "as used herein intends to refer to a film or a sheet or a laminate or similar structure, which has at least 2, and preferably at least 3, preferably different, layers, such as for instance at least 2, 3, 4, 5, 6, 7 or more layers. Said layers are laminated or bonded to each other. A "multilayer structure" as provided herein may thus be a film or a sheet. In certain embodiments the terms "structure", "film" or sheet" are used interchangeably.

A multilayer structure according to the invention may be any suitable thickness, and preferably has a thickness comprised between 10 and 1500 µm, and preferably between 10 and 750 µm. Accordingly, each layer of said multilayer structure according to the invention may be of any suitable thickness, depending on its targeted properties. Total thickness of a multilayer structure as given herein may depend on its (end)application. Thickness of a multilayer structure as a whole, or of one or more layers thereof may be determined by any technique known to the person skilled in the art. For instance, measurements of total thickness can be performed inline by e.g. X-Ray transmission gauges or offline by a micrometer. Microscopy of a cross section of a film can be used to determine thickness of individual layers.

In a first aspect, a multilayer structure, such as a film or sheet, as provided herein comprises at least one layer capable of providing gas barrier properties, and preferably oxygen gas barrier properties, wherein said layer comprises at least 40 wt % based on the total weight of the layer; such as from 40 to 100 wt %, based on the total weight of the layer, of a glycolide-rich poly(lactide-co-glycolide) (PLGA) polymer as defined herein. Hence, the invention provides a multilayer structure, such as a film or sheet, as provided herein and comprising at least one layer capable of providing gas barrier properties, and preferably oxygen gas barrier properties, wherein said layer comprises, based on a total weight of the layer at least 40 wt %, such as from 40 to 100 wt % of a poly(lactide-co-glycolide) (PLGA) polymer having at most 30 mol % of lactide. For example, a multilayer structure comprising at least one barrier layer, preferably a barrier layer providing gas barrier properties, and more preferably a barrier layer providing oxygen gas barrier properties, is provided wherein said barrier layer comprises from 40 to 100 wt % of a poly(lactide-co-glycolide) (PLGA) polymer, and preferably from 50 to 100 wt %, or from 60 to 100 wt %, or from 75 to 100 wt %, or from 80 to 100 wt %, or from 85 to 100 wt %, or from 90 to 100 wt %, or from 95 to 100 wt % based on the total weight of the layer, of said PLGA polymer, wherein said PLGA polymer has at most 30 mol % of lactide, preferably from 2 to 30 mol % lactide, preferably from 5 to 25 mol % lactide, preferably from 5 to 15 mol % lactide, preferably from 9 to 14 mol % lactide.

In another embodiment, a multilayer structure, such as a film or sheet, as provided herein comprises:
(i) at least one layer A, which may also be denoted herein as a "base layer" or "bulk layer";
(ii) at least one layer B, which may also be denoted herein as a "tie layer" or "adhesive layer" or "binding layer". This layer is disposed in between two adjacent layers, i.e. in between layer A and layer C (described below), and is capable of binding, preferably irreversibly binding, said layer A to said layer C; and
(iii) at least one layer C, which may also be denoted herein as a "barrier layer", and which is capable of providing beneficial properties, e.g. barrier properties towards chemicals, water vapour, aroma's, gases such as carbon gas, nitrogen gas, oxygen gas, etc.

Preferably, said layer C provides good barrier properties towards oxygen gas, with barrier properties meaning that said layer permits to reduce the transmission of the gas through this layer. In certain embodiments, said layer C provides in addition thereto, good barrier properties towards water vapour transmission, with barrier properties meaning that said layer permits to reduce the transmission of water vapour through this layer.

In certain embodiments, layer A of a multilayer structure as described herein forms an outer or external layer of said structure. In certain embodiments, layer A of a multilayer structure as described is a liquid-tight layer.

In certain embodiments, layer C of a multilayer structure as described herein forms an inner or internal layer of said structure. In certain embodiments, layer C of a multilayer structure as described is a liquid-tight layer. In certain embodiments of the present invention the terms "barrier layer" and "layer C" are used interchangeably.

In one example, a multilayer structure, such as a multilayer film or sheet, as provided herein has the following sequence of layers (as denoted above): A/B/C. In another example, a multilayer structure, such as a film or sheet, as provided herein has the following sequence of layers (as denoted above): A/B/C/B/A. It will be apparent that also other sequence of layers may be envisaged by the present invention. In addition thereto, a multilayer structure as described herein may be provided with other layers, different from a base layer A, tie layer B or barrier layer C, as defined herein. Such additional layers may for instance include layer(s) for sealing, coating layers, layers for laminating to paperboard, etc.

A multilayer structure as described herein may be prepared by any method well known in the art of making multilayer structures, for example by means of co-extrusion, coating, extrusion coating, lamination and any combinations thereof. It is in general desired for multilayer co-extrusion processes to have a minimal difference in viscosity of the extruded resins. In certain embodiments, it is therefore preferred to minimize the viscosity differences, and hence the differences in melt flow rates, between the polymer resins (PGA, PLGA and the PLA) applied in the different layers of a multilayer structure, in order to optimise sheet production and quality. Optionally, also additives such as chain extenders may be added to the resins to that end.

In certain embodiments, the invention therefore also provides a multilayer structure as described herein wherein said structure is obtained by co-extrusion, coating, extrusion coating, lamination and any combination thereof.

The characteristics of the different layers A, B and C as provided herein will now be discussed in more detail.

Base Layer (Layer A)

In certain embodiments, a multilayer structure as described herein comprises at least one base layer, e.g. base layer "A". The terms "base layer", "layer A", "base layer A" are used herein as synonyms. A base layer may provide certain functional or mechanical properties to a multilayer structure and the article made therefrom as described herein.

A layer A as described herein comprises a PLA polymer and optionally a nucleating agent.

The terms "PLA", "polylactide", and "polylactic acid" are used herein as synonyms.

A "PLA polymer" as used herein refers to a polymer of lactide (monomers). Lactide can exist in three different geometric structures, which have a diastereomeric relationship. The term "lactide" (or "lactide monomer") as used herein may therefore be L-lactide (derived from two L-lactic acid molecules), D-lactide (derived from two D-lactic acid molecules), meso-lactide (derived from a L-lactic acid molecule and a D-lactic acid molecule), or a mixture of two or more of the above. A 50/50 mixture of L-lactide and D-lactide with a melting point of about 126° C. is often referred to in the literature as D,L-lactide or racemic lactide (and is also denoted as "rac-Lactide" or "racemic lactide" or "rac-lactide" herein). A PLA polymer as defined herein may thus be a polymer of lactide (monomer) selected from the group comprising L-lactide, D-lactide, meso-lactide, racemic lactide and any mixture of two or more thereof.

In certain embodiments, a PLA polymer as defined herein is a polymer of lactide (monomer) as defined herein only, i.e. such polymer does not comprise any other monomer which is not a lactide. In certain embodiments, a PLA polymer which does not comprise any monomer which is not a lactide, is also denoted herein as a "PLA homopolymer". Such PLA homopolymer may thus consist of lactide, e.g. lactide which is selected from the group comprising L-lactide, D-lactide, meso-lactide, racemic lactide and any mixture of two or more thereof.

More in particular in certain embodiments, a multilayer structure is provided herein wherein said PLA polymer is selected from the group comprising, and preferably consisting of, poly(L-lactic acid) (PLLA), poly(D-lactic acid) (PDLA), and poly(L-,D-lactic acid) (PLDLA), and any mixture thereof. Stereocomplexes of PLLA and PDLA, as described for example in WO 2010/097463, can also be used as a PLA polymer in layer A.

By "PLLA" or "poly(L-lactic acid)" is meant a PLA polymer in which at least 98.5 wt % of the repetitive units are L-lactic acid monomers.

By "PDLA" or "poly(D-lactic acid)" is meant a PLA polymer in which at least 98.5 wt % of the repetitive units are D-lactic acid monomers.

Preferably, PLLA or PDLA have an optical purity (called isomeric purity) of the L or D isomer, respectively, which is equal to or higher than 98.5 wt % of the PLA, preferably higher than 99 wt %. An optical purity from at least 99.5 wt % is even more preferred. A PLLA used in the invention thus includes a content of D isomer lower than 1.5 wt %, preferably lower than 1 wt %, more preferably lower or equal to 0.5 wt % of the PLLA. By analogy, a PDLA used in the invention includes a content of L isomer lower than 1.5 wt %, preferably lower than 1 wt %, more preferably lower or equal to 0.5 wt % of the PDLA.

By "PLDLA" or "poly(L-,D-lactic acid) is meant a PLA polymer having monomers of both L-lactic acid and D-lactic acid, and wherein from 50 wt % to lower than 98.5 wt %, preferably from 80 wt % to lower than 98.5 wt %, and more preferably from 85 wt % to lower than 98.5 wt % of the repetitive units of said PLA polymer are monomers of either L-lactic acid or D-lactic acid, the remaining of the repetitive units being monomers of D-lactic acid or L-lactic acid, respectively.

In other words, a PLDLA has an optical purity (called isomeric purity) of the L or D lactic acid isomer comprised between 50 wt % and lower than 98.5 wt % of the polymer, and preferably between 80 wt % and lower than 98.5 wt % of the polymer, and more preferably between 85 wt %, and lower than 98.5 wt % of the polymer.

PLA, and in particular, any of PLLA, PDLA, or PLDLA, as used herein preferably has a weight average molecular weight (Mw) ranging between 30.000 and 500.000 g/mol, more preferably between 50.000 and 400.000 g/mol, even more preferably between 50.000 and 300.000 g/mol. The weight average molecular weight is measured by chromatography by gel permeation compared to polystyrene standards in chloroform at 30° C., as well known to the skilled person.

PLA, and in particular any of PLLA, PDLA, or PLDLA, as used herein preferably has a dispersity (D-stroke or Đ) of between about 1.0 and about 5.0, and for instance between 1.0 and 3.0 or for instance between 1.0 and 2.0. Dispersity can be calculated using the equation $Đ=M_w/M_n$, wherein $M_w$ is the weight-average molar mass and $M_n$ is the number-average molar mass.

A PLLA or PDLA as used herein may have variable thermal properties, and may be from fully amorphous to semi-crystalline with melting points down to as low as 130° C. and up to as high as 180° C.

The process for preparing PLA is well-known by the person skilled in the art.

For example, in an embodiment, the PLA is obtained by polymerizing lactide, in the presence of a suitable catalyst and preferably in the presence of a compound of formula (I), acting as a co-initiator and transfer agent of the polymerization,

$$R^1-OH \qquad (I)$$

wherein $R^1$ is selected from the group comprising $C_{1-20}$alkyl, $C_{6-30}$aryl, and $C_{6-30}$aryl$C_{1-20}$alkyl optionally substituted by one or more substituents selected from the group comprising halogen, hydroxyl, and $C_{1-6}$alkyl. Preferably, $R^1$ is selected from $C_{3-12}$alkyl, $C_{6-10}$aryl, and $C_{6-10}$aryl$C_{3-12}$alkyl, optionally substituted by one or more substituents, each independently selected from the group comprising halogen, hydroxyl, and $C_{1-6}$alkyl; preferably, $R^1$ is selected from $C_{3-12}$alkyl, $C_{6-10}$aryl, and $C_{6-10}$aryl$C_{3-12}$alkyl, optionally substituted by one or more substituents, each independently selected from the group comprising halogen, hydroxyl and $C_{1-4}$alkyl. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol.

In an embodiment, non-limiting examples of initiators include 1-octanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol,1,4-benzenedimethanol, and (4-trifluoromethyl) benzyl alcohol; preferably, said compound of formula (I) is selected from 1-octanol, isopropanol, and 1,4-butanediol.

In certain embodiments, a PLA polymer as comprised in a layer A of a multilayer structure according to the invention may comprise limited amounts of a comonomer which is not a lactide as defined herein. More in particular, a PLA polymer as comprised in a layer A of a multilayer structure according to the invention may include a PLA copolymer, i.e. a copolymer of a lactide and a non-lactide comonomer. The term "PLA copolymer" as used herein intends to refer to a polymer of lactide (monomer) (as defined herein) and a comonomer which is not lactide (i.e. a non-lactide comonomer).

In a preferred embodiment, a non-lactide comonomer is selected from the group comprising urethanes, carbonates, lactones. For instance, copolymers of lactide and trimethylene carbonate may be used. For instance copolymers of lactide and urethanes may be used. For instance, copolymers of lactide and lactones may be used. In a preferred embodiment, said comonomer is a lactone. Preferably said lactone is selected from the group comprising caprolactone, valerolactone, and butyrolactone. For instance, copolymers of lactide and caprolactone may be used in layer A of the multilayer structure.

In some embodiments, the introduction of comonomers to PLA increases the ductility (i.e. decreases the brittleness) of the PLA. Additionally it is appreciated that if said layer A comprise a PLA copolymer, as defined herein such PLA copolymer comprises a non-lactide comonomer content in a very specific range. Preferably, the amount of a non-lactide comonomer in a PLA copolymer, for use in the present invention, is at most 30 wt %, based on the total weight of the PLA copolymer, and preferably comprised between 1 and 20 wt % or between 1 and 10 wt %, or between 2 and 7 wt %, or between 2 and 5 wt %, based on the total weight of the PLA copolymer. A PLA copolymer as applied herein can be understood to mean any type of copolymer, including but not limited to a random copolymer, a block copolymer, a gradient copolymer, and a statistical copolymer.

In certain embodiments, a PLA polymer, as defined herein above, is preferably present in a base layer (layer A) of a multilayer structure as defined herein, in an amount ranging from at least 50 wt %, for example at least 55 wt %, for example at least 60 wt %, for example at least 65 wt %, for example at least 70 wt %, for example at least 75 wt %, for example at least 80 wt %, for example at least 85 wt %, for example at least 90 wt %, for example at least 95 wt %, for example at least 96 wt %, for example at least 97 wt %, for example at least 98 wt %, for example at least 99 wt %, for example at least 99.4 wt %, for example at least 99.5 wt % up to 100 wt %, based on the total weight of layer A.

In particular embodiments, a multilayer structure is provided herein wherein said base layer (layer A) comprises from 50 to 100 wt %, or from 55 to 100 wt %, or from 60 to 100 wt %, or from 65 to 100 wt %, or from 70 to 100 wt %, or from 75 to 100 wt %, or from 80 to 100 wt %, or from 85 to 100 wt %, or from 90 to 100 wt %, or from 95 to 100 wt % of a PLA polymer as described herein. The above referenced wt % amounts are based on the total weight of layer A. In certain embodiments, layer A consists of a PLA polymer as described herein.

In certain embodiments, said layer A comprises a mixture (i.e. a blend) of polymers. In certain embodiments, said layer A comprises a mixture (i.e. a blend) of a PLA polymer as defined herein and one or more polymers different from PLA. In certain embodiments, said layer A comprises a mixture of PLA polymer, i.e. PLA homopolymer or PLA copolymer as defined herein above, and one or more polymers different from PLA.

In other words, in certain embodiments, said PLA polymer as defined herein is provided in layer A of a multilayer structure as described herein as a mixture of with one of more non-PLA polymers.

The terms "polymer different from PLA" and "non-PLA polymer" are used as synonyms herein.

In some embodiments, said polymers different from PLA (i.e. "non-PLA polymers") are selected from the group comprising polycaprolactone (PCL), polybutylene succinate (PBS), polybutylene adipate (PBA), polybutylene succinate adipate (PBSA), polyhydroxyalkanoates (PHA), polybutylene adipate terephtalate (PBAT), thermoplastic starch (TPS) and non-thermoplastic starch (TPS).

Examples of suitable polyhydroxyalkanoates include but are not limited to poly-4-hydroxybutyrates (P4HB), poly-3-hydroxybutyrates (PHB), polyhydroxyvalerate (PHV), polyhydroxyhexanoate (PHH), polyhydroxyoctanoate (PHO) and copolymers thereof, such as e.g. poly(3-hydroxybutyrate-co-3-hydroxyvalerate) (PHBV).

Starch is also understood as amylose. Thermoplastic starches are typically formed by plasticizing a native starch with a functional plasticizer or mixture of plasticizers, such as polyfunctional alcohols, e.g., ethylene glycol, propylene glycol, or glycerol.

In certain embodiments, the said layer A comprises a mixture of a PLA polymer as defined herein and one or more polymers different from PLA as defined herein, wherein the total amount of polymers different from PLA comprised in layer A is lower than 50 wt % based on the total weight of the layer A, and preferably lower than 40 wt %, lower than 30 wt %, lower than 25 wt %, lower than 20 wt %, lower than 15 wt %, lower than 10 wt %, or lower than 5 wt %, based on the total weight of the layer A.

In certain embodiment, the invention provides a multilayer structure as described herein, wherein said layer A further comprises one or more polymers different from PLA. Preferably, said layer A comprises one or more polymers different from PLA, wherein the total amount of polymers different from PLA comprised in layer A is lower than 50 wt % based on the total weight of the layer A, and preferably lower than 40 wt %, lower than 30 wt %, lower than 25 wt %, lower than 20 wt %, lower than 15 wt %, lower than 10 wt %, or lower than 5 wt %, based on the total weight of the layer A.

In certain embodiments, a multilayer structure is provided herein wherein said base layer (layer A) comprises a nucleating agent. Preferably, a nucleating agent, if present, may be applied in a layer A in an amount of at most 15 wt %, preferably at most 10 wt %, such as in an amount of from 2 to 15 wt % or from 5 to 10 wt %, or from 1 to 5 wt %, or from 1 to 3 wt %, based on the total amount of said layer A. Suitable nucleating agents may for instance include, but are not limited to nucleating agents such as e.g. talc, kaolin, ethylene bis(stearamide) (EBS), an aromatic sulfonate derivative such as LAK-301 as supplied by the company Takemoto Oil & Fat or any mixture thereof.

Tie Layer (Layer B)

A multilayer structure described herein further comprises at least one layer B. The terms "tie layer", "adhesive layer", and "layer B", are used herein as synonyms. Layer B is a layer disposed between at least one layer A and at least one layer C, and is capable of binding or laminating said layer A to said layer C. Typically, at least one layer B will form the intermediate layer between a layer A and a layer C of a multilayer structure as described herein.

A layer B as described herein comprises a poly(lactide-co-glycolide) (PLGA) polymer, and in particular a PLGA polymer having more than 30 mol % of lactide.

The term "PLGA" or "poly(lactide-co-glycolide)" or "PLGA polymer" or "poly(lactide-co-glycolide) polymer" are used herein as synonyms and refer to a polymer comprising lactide and glycolide. PLGA is a linear copolymer that can be prepared at different ratios between its constituent monomers, lactic acid and glycolic acid according to methods that are well known to the skilled person. For instance, PLGA can be synthesized by ring opening polymerization (ROP) of lactide and glycolide. Depending on the ratio of lactide to glycolide used for the polymerization, different forms of PLGA can be obtained. PLGA is a biocompatible and biodegradable polymer.

It has now surprisingly been found by the inventors that the application of PLGA polymers having an amount of lactide of more than 30 mol % in a layer of a multilayer structure, may be particularly beneficial, as this type of PLGA polymer provides good adhesive or binding properties. It was shown that such type of PLGA polymers as described herein is particularly suitable for being applied as tie layer in a multilayer structure. The use of this type of resin in a tie layer, positioned between two other layers, permits to form an integral multilayered structure, showing reduced delamination effects.

A PLGA having an amount of lactide of more than 30 mol % is also indicated herein as a "lactide-rich" PLGA. The term "lactide-rich PLGA" as used herein therefore also denotes a PLGA containing more than 30 mol % lactide as defined herein below, such as e.g. a PLGA containing from 35 to 75 mol % lactide, or containing from 38 to 70 mol % lactide, or containing from 40 to 60 mol % lactide, or containing from 45 to 55 mol % lactide, or containing about 50 mol % of lactide.

In particular embodiments, a layer B comprises a (lactide-rich) PLGA as described herein having from 35 to 75 mol % lactide, preferably from 38 to 70 mol % lactide, more preferably from 40 to 60 mol % lactide, and even more preferably from 45 to 55 mol % lactide. By analogy, a layer B comprises a (lactide-rich) PLGA as described herein which has from 25 to 65 mol % glycolide, and for instance from 30 to 62 mol %, and for instance from 40 to 60 mol %, and for instance from 45 to 55 mol % glycolide.

In certain embodiments, a lactide-rich PLGA polymer for use in layer B of a multilayer structure as described herein, has a molar ratio of glycolide to lactide (G:L) which is comprised between (35:65) and (65:35), such as between (38:62) and (62:38), such as between (40:60) and (60:40), or between (45:55) and (55:45), and for instance is about (50:50). In an example a PLGA is provided in layer B wherein the molar ratio of glycolide to lactide is (45:55)+/−10%, preferably (45:55)+/−5%, more preferably (45:55)+/−1%. In another example a PLGA is provided in layer B wherein said PLGA has a molar ratio of glycolide to lactide of (50:50)+/−10%, preferably (50:50)+/−5%, more preferably (50:50)+/−1%.

In certain embodiments, layer B of a multilayer structure as described herein comprises a PLGA polymer which may be selected from the group comprising poly(L-lactide-co-glycolide) (L-PLGA), poly(D-lactide-co-glycolide) (D-PLGA) and mixtures thereof. By L-PLGA, it is meant a polymer in which more than 98.5 wt % of the repetitive lactide units are L-lactide and by D-PLGA, a polymer is meant in which more than 98.5 wt % of the repetitive lactide units are D-lactide.

PLGA (L-PLGA or D-PLGA) comprised in layer B preferably may have a weight average molecular weight (Mw) ranging between 30.000 and 500.000 g/mol, more preferably between 40.000 and 400.000 g/mol, even more preferably between 50.000 and 300.000. The weight average molecular weight can be measured by chromatography by gel permeation compared to polystyrene standards in chloroform at 30° C., as is well known to the skilled person.

PLGA (L-PLGA or D-PLGA) comprised in layer B preferably has a dispersity (D-stroke or Ð) of between about 1.0 and about 5.0, and for instance between 1.0 and 3.0 or for instance between 1.0 and 2.0.

In addition a lactide-rich PLGA polymer as defined herein and as comprised in a layer B of a structure according to the invention preferably has one or more of the following features:
(a) a melt flow rate (measured at 175° C./2.16 kg, ISO1133 A-2011) of 1 to 50 g/10 min;
(b) a glass transition temperature (as measured by Differential Scanning calorimetry (DSC) at 10 K/min) of 40 to 50° C.

In certain embodiments, a multilayer structure is provided wherein layer B comprises from 50 to 100 wt %, or from 55 to 100 wt %, or from 60 to 100 wt %, or from 65 to 100 wt %, or from 70 to 100 wt %, or from 75 to 100 wt %, 80 to 100 wt %, or from 85 to 100 wt %, or from 90 to 100 wt %, or from 95 to 100 wt % based on the total weight of the layer, of a PLGA polymer having more than 30 mol % lactide as described herein.

In certain embodiments, a PLGA polymer having more than 30 mol % lactide, as defined herein above, is preferably present in an adhesive layer (layer B) of a multilayer structure as defined herein, in an amount ranging from at least 50 wt %, for example at least 55 wt %, for example at least 60 wt %, for example at least 65 wt %, for example at least 70 wt %, for example at least 75 wt %, for example at least 80 wt %, for example at least 85 wt %, for example at least 90 wt %, for example at least 95 wt %, for example at least 96 wt %, for example at least 97 wt %, for example at least 98 wt %, for example at least 99 wt %, for example at least 99.4 wt %, for example at least 99.5 wt % up to 100 wt %, based on the total weight of layer B. The above referenced wt % amounts are based on the total weight of layer B.

Therefore, the present invention also relates to the use of a lactide-rich PLGA polymer as defined herein, as an adhesive resin in a layer of a multilayer structure, preferably in a tie layer (adhesive layer) of a multilayer structure. The present invention relates to the use of a PLGA polymer having more than 30 mol % lactide as described, and preferably having from 35 to 75 mol % lactide, preferably from 38 to 70 mol % lactide, and more preferably from 40 to 60 mol % lactide, and more preferably from 45 to 55 mol % lactide, as an adhesive resin in a layer of a multilayer structure, preferably in a tie layer (adhesive layer) of a multilayer structure. Preferably said PLGA polymer having more than 30 mol % lactide as described herein is applied in a layer, preferably a tie layer, of a multilayer structure in an amount, based on the total weight of layer B, of at least 50 wt %, for example at least 55 wt %, for example of at least 60 wt %, for example at least 70 wt %, for example at least 75 wt %, for example of at least 80 wt %, for example at least 85 wt %, for example of at least 90 wt %, for example of at least 95 wt %, for example of at least 96 wt %, for example of at least 97 wt %, for example of at least 98 wt %, for example of at least 99 wt %, for example of at least 99.4 wt %, for example of at least 99.5 wt %, for example of 100 wt %. In certain embodiments, layer B consists of PLGA having more than 30 mol % lactide as described herein, and preferably having from 35 to 75 mol % lactide, preferably from 38 to 70 mol % lactide, and more preferably from 40 to 60 mol % lactide, and more preferably from 45 to 55 mol % lactide.

Barrier Layer (Layer C)

In addition to the layer(s) A and B, a multilayer structure according to the invention comprises at least one layer C, wherein layer C comprises a PGA polymer and/or a PLGA polymer. The terms "barrier layer", and "layer C", may be used herein as synonyms.

A layer C, as applied in a multilayer structure defined herein, preferably provides barrier properties to a multilayer structure and article made therefrom. Barrier properties include for instance a reduction in the permeability of gasses such as O2, CO2, and N2. In other words, a multilayer structure according to the invention permits to reduce the transmission of gasses, especially oxygen, through said structure by applying at least one layer comprising PGA polymer and/or PLGA polymer. In certain embodiments, a layer C as applied in a multilayer structure defined herein, may also provide barrier properties against the permeability of water vapour and/or aroma compounds.

In certain embodiments, a multilayer structure is provided herein comprising at least one barrier layer providing gas barrier properties, and preferably a barrier layer providing oxygen gas barrier properties, wherein said barrier layer comprises PLGA polymer having at most 30 mol % of lactide.

In certain embodiments, a multilayer structure is provided comprising at least three different layers A, B and C, wherein said layer B is disposed between said layer A and said layer C and is capable of binding said layer A to said layer C, and wherein said layer A comprises a polylactide (PLA) polymer and optionally a nucleating agent, said layer B comprises a poly(lactide-co-glycolide) (PLGA) polymer having more than 30 mol % of lactide, and said layer C comprises a polyglycolide (PGA) polymer and/or a poly(lactide-co-glycolide) (PLGA) polymer having at most 30 mol % of lactide.

Hence, a "barrier layer" or a "layer C" as described herein comprises a polyglycolide (PGA) polymer, and/or poly (lactide-co-glycolide) (PLGA) polymer comprising at most 30 mol % of lactide.

The terms "polyglycolide", "PGA" and "polyglycolic acid" are used herein as synonyms. Polyglycolide (PGA) is, like PLA, a viable degradable alternative to traditional barrier resins, and can be synthesized by ring-opening polymerization (ROP) of the related cyclic esters such as lactide (LA) and glycolide (GA) by different enzymatic, cationic, anionic, or coordination-insertion polymerization mechanisms according to techniques well known to the skilled person.

It has now surprisingly been found by the inventors that the application of PLGA polymers having an amount of lactide of at most 30 mol % in a layer of a multilayer structure given herein, may be particularly beneficial, as this type of PLGA polymer provides good barrier properties, especially good gas barrier properties, such as oxygen gas barrier properties.

A PLGA having an amount of lactide of at most 30 mol % is also indicated herein as a "glycolide-rich" PLGA. The term "glycolide-rich PLGA" as used herein therefore also denotes a PLGA containing at most 30 mol % lactide (as defined herein), such as a PLGA polymer having from 2 to 30 mol % lactide, or from 5 to 25 mol % lactide, or from 5 to 15 mol % lactide, or from 9 to 14 mol % lactide.

Surprisingly, the inventors have shown that the application of a PLGA polymer having at most 30 mol % of lactide in a layer of a multilayer structure as described herein, may be particularly beneficial, as this type of PLGA polymer provides excellent gas barrier properties, and in particular provides excellent high oxygen gas barrier properties. Moreover, using this type of (glycolide-rich) PLGA polymer facilitates preparation and processing of the layer.

In particular embodiments, a layer C comprises a (glycolide-rich) PLGA as described herein having from 2 to 30 mol % lactide, and preferably from 5 to 25 mol % lactide, and more preferably from 5 to 15 mol % lactide, and more preferably from 9 to 14 mol %. By analogy, a layer C comprises a (glycolide-rich) PLGA as described herein which has between 70 to 98 mol %, or between 75 to 95 mol %, or between 85 to 95 mol %, or between 86 and 91 mol %.

In certain embodiments, a glycolide-rich PLGA polymer for use in layer C of a multilayer structure as described herein, has a molar ratio of glycolide to lactide (G:L) which is comprised between (80:20) and (98:2), such as between (85:15) and (95:5), and for instance is about (90:10). In an example a PLGA is provided in layer C wherein the molar ratio of glycolide to lactide in the PLGA is (90:10)+/−10%, preferably (90:10)+/−5%, more preferably (90:10)+/−1%. In another example a PLGA is provided in layer C wherein the (weight) ratio of glycolide to lactide in the PLGA is (90:10)+/−10%, preferably (90:10)+/−5%, more preferably (90:10)+/−1%. In another example a PLGA is provided in layer C wherein the (weight) ratio of glycolide to lactide is (85:15)+/−10%, preferably (85:15)+/−5%, more preferably (85:15)+/−1%. In another example a PLGA is provided in layer C wherein the (weight) ratio of glycolide to lactide in the PLGA is (80:20)+/−10%, preferably (80:20)+/−5%, more preferably (80:20)+/−1%.

A PLGA polymer comprised in a barrier layer or layer C may be selected from the group comprising poly(L-lactide-co-glycolide) (L-PLGA), poly(D-lactide-co-glycolide) (D-PLGA) and mixtures of L-PLGA and D-PLGA. L-PLGA and D-PLGA are as defined herein above.

A PLGA (L-PLGA or D-PLGA) comprised in a layer C or a barrier layer according to the invention preferably has a weight average molecular weight (Mw) ranging between 30.000 and 500.000 g/mol, more preferably between 40.000 and 400.000 g/mol, even more preferably between 50.000 and 300.000 g/mol. The weight average molecular weight may be measured by chromatography by gel permeation compared to polystyrene standards in chloroform at 30° C., as well known to the skilled person.

A PLGA (L-PLGA or D-PLGA) comprised in a layer C or a barrier layer according to the invention preferably has a dispersity (D-stroke or D) of between about 1.0 and about 5.0, and for instance between 1.0 and 3.0 or for instance between 1.0 and 2.0.

A glycolide-rich PLGA as comprised in a barrier layer or layer C according to the invention preferably has one or more of the following features:
a) a melt flow rate (measured at 230° C./2.16 kg, ISO1133-A-2011) of 1 to 50 g/10 min;
b) a glass transition temperature (as measured by Differential Scanning calorimetry (DSC) at 10K/min) of 35 to 45° C.;
c) a melting point (as measured by Differential Scanning calorimetry (DSC) at 10K/min) of between 190 and 230° C.

In certain embodiments, a multilayer structure is provided wherein a barrier layer (layer C) comprises from 40 to 100 wt %, or from 50 to 100 wt %, or from 55 to 100 wt %, or from 60 to 100 wt %, or from 65 to 100 wt %, or from 70 to 100 wt %, or from 75 to 100 wt %, 80 to 100 wt %, or from 85 to 100 wt %, or from 90 to 100 wt %, or from 95 to 100 wt % of a PLGA polymer having at most 30 mol % lactide as described herein. In certain embodiments, a multilayer structure is provided wherein a barrier layer (layer C) comprises at least 40 wt %, for example of at least 50 wt %, for example of at least 55 wt %, for example of at least 60 wt %, for example of at least 65 wt %, for example of at least 70 wt %, for example of at least 75 wt %, for example of at least 80 wt %, for example of at least 85 wt %, for example of at least 90 wt %, for example of at least 95 wt %, for example of at least 96 wt %, for example of at least 97 wt %, for example of at least 98 wt %, for example of at least 99 wt %, for example of at least 99.4 wt %, for example of at least 99.5 wt %, based on the total weight of the barrier layer, of a PLGA polymer having at most 30 mol % lactide as described herein. The above referenced wt % amounts are based on the total weight of layer C (i.e. the barrier layer).

Therefore, the present invention also relates to the use of a glycolide-rich PLGA polymer as defined herein, as a gas barrier resin, preferably as oxygen gas barrier resin, in a layer of a multilayer structure, preferably in a barrier layer of a multilayer structure. The present invention thus also relates to the use of a PLGA polymer having at most 30 mol % lactide as described herein, and preferably having from 2 to 30 mol % lactide, and preferably from 5 to 25 mol % lactide, and more preferably from 5 to 15 mol % lactide, and more preferably from 9 to 14 mol % lactide, as a gas barrier resin, preferably as oxygen gas barrier resin, in a layer of a multilayer structure, preferably in a barrier layer of a multilayer structure. Preferably said PLGA polymer having at most 30 mol % lactide as described herein is applied in a layer, preferably a barrier layer, of a multilayer structure in an amount, based on the total weight of the barrier layer, of at least 40 wt %, for example of at least 50 wt %, for example of at least 55 wt %, for example of at least 60 wt %, for example of at least 65 wt %, for example of at least 70 wt %, for example of at least 75 wt %, for example of at least 80 wt %, for example of at least 85 wt %, for example of at least 90 wt %, for example of at least 95 wt %, for example of at least 96 wt %, for example of at least 97 wt %, for example of at least 98 wt %, for example of at least 99 wt %, for example of at least 99.4 wt %, for example of at least 99.5 wt %, for example of 100 wt %. In certain embodiments, layer C consists of PLGA having at most 30 mol % lactide as described herein, and preferably having from 2 to 30 mol % lactide, and preferably from 5 to 25 mol % lactide, and more preferably from 5 to 15 mol % lactide, and more preferably from 9 to 14 mol % lactide.

In certain embodiments, a multilayer structure is provided wherein said barrier layer (layer C) comprises from 40 to 100 wt %, from 50 to 100 wt %, or from 55 to 100 wt %, from 60 to 100 wt %, or from 65 to 100 wt %, or from 70 to 100 wt %, or from 75 to 100 wt %, or from 80 to 100 wt %, or from 85 to 100 wt %, or from 90 to 100 wt %, or from 95 to 100 wt % of a PGA. In certain embodiments, layer C consists of PGA. In certain embodiments, a multilayer structure is provided wherein a barrier layer (layer C) comprises at least 40 wt %, for example of at least 50 wt %, for example of at least 55 wt %, for example of at least 60 wt %, for example of at least 65 wt %, for example of at least 70 wt %, for example of at least 75 wt %, for example of at least 80 wt %, for example of at least 85 wt %, for example of at least 90 wt %, for example of at least 95 wt %, for example of at least 96 wt %, for example of at least 97 wt %, for example of at least 98 wt %, for example of at least 99 wt %, for example of at least 99.4 wt %, for example of at least 99.5 wt %, based on the total weight of the barrier layer of a PGA polymer as described herein.

In certain embodiments, a multilayer structure is provided comprising at least three different layers A, B and C, wherein said layer B is disposed between said layer A and said layer C and is capable of binding said layer A to said layer C, and wherein said layer A comprises a polylactide (PLA) polymer and optionally a nucleating agent, said layer B comprises a poly(lactide-co-glycolide) (PLGA) polymer having more than 30 mol % of lactide, and said layer C comprises a polyglycolide (PGA) polymer. Said layers A, B and C are preferably as defined herein. Preferably, said layer A comprises from 80 to 100 wt % (wt % based on the total weight of the layer) of a polylactide (PLA) polymer as described herein, preferably selected from the group comprising poly(L-lactic acid) (PLLA), poly(D-lactic acid) (PDLA), poly(L-,D-lactic acid) (PLDLA), and any mixtures thereof; and from 0 to 15 wt %, preferably from 0 to 10 wt % or from 0 to 5 wt % (wt % based on the total weight of the layer) of a nucleating agent. Preferably, said layer B comprises from 80 to 100 wt % (wt % based on the total weight of the layer) of a poly(lactide-co-glycolide) (PLGA) polymer having more than 30 mol % of lactide as described herein, and preferably having from 35 to 75 mol % lactide, and preferably from 38 to 70 mol % lactide, and more preferably from 40 to 60 mol % lactide, and more preferably from 45 to 55 mol % lactide. Preferably, said layer C comprises from 90 to 100 wt %, or from 95 to 100 wt % (wt % based on the total weight of the layer) of polyglycolide (PGA) polymer as described herein.

In certain embodiments, a multilayer structure is provided comprising at least three different layers A, B and C, wherein said layer B is disposed between said layer A and said layer C and is capable of binding said layer A to said layer C, and wherein said layer A comprises a polylactide (PLA) polymer and optionally a nucleating agent, said layer B comprises a poly(lactide-co-glycolide) (PLGA) polymer having more than 30 mol % of lactide, and said layer C comprises a poly(lactide-co-glycolide) (PLGA) polymer having at most 30 mol % of lactide. Said layers A, B and C are as defined herein. Preferably, said layer A comprises from 80 to 100 wt % (wt % based on the total weight of the layer) of a polylactide (PLA) polymer as described herein, preferably selected from the group comprising poly(L-lactic acid) (PLLA), poly(D-lactic acid) (PDLA), poly(L-,D-lactic acid) (PLDLA), and any mixtures thereof; and from 0 to 15 wt %, preferably from 0 to 10 wt % or from 0 to 5 wt % (wt % based on the total weight of the layer) of a nucleating agent. Preferably, said layer B comprises from 80 to 100 wt % (wt % based on based on the total weight of the layer) of a poly(lactide-co-glycolide) (PLGA) polymer having more than 30 mol % of lactide as described herein, and preferably having from 35 to 75 mol % lactide, and preferably from 38 to 70 mol % lactide, and more preferably from 40 to 60 mol % lactide, and more preferably from 45 to 55 mol % lactide. Preferably, said layer C comprises from 90 to 100 wt %, or from 95 to 100 wt % (wt % based on the total weight of the layer) of a poly(lactide-co-glycolide) (PLGA) polymer having at most 30 mol % of lactide as described herein, and preferably having from 2 to 30 mol % lactide, and preferably from 5 to 25 mol % lactide, and more preferably from 5 to 15 mol % lactide, and more preferably from 9 to 14 mol % lactide.

In certain embodiments, a multilayer structure is provided comprising at least three different layers A, B and C, wherein said layer B is disposed between said layer A and said layer C and is capable of binding said layer A to said layer C, and wherein said layer A comprises a polylactide (PLA) polymer and optionally a nucleating agent, said layer B comprises a poly(lactide-co-glycolide) (PLGA) polymer having more than 30 mol % of lactide, and said layer C comprises a polyglycolide (PGA) polymer and a poly(lactide-co-glycolide) (PLGA) polymer having at most 30 mol % of lactide. Said layers A, B and C have the features as defined herein. Said layers A, B and C are as defined herein. Preferably, said layer A comprises from 80 to 100 wt % (wt % based on the total weight of the layer) of a polylactide (PLA) polymer as described herein, preferably selected from the group comprising poly(L-lactic acid) (PLLA), poly(D-lactic acid) (PDLA), poly(L-,D-lactic acid) (PLDLA), and any mixtures thereof; and from 0 to 15 wt %, preferably from 0 to 10 wt % or from 0 to 5 wt % (wt % based on the total weight of the layer) of a nucleating agent. Preferably, said layer B comprises from 80 to 100 wt % (wt % based on the total weight of the layer) of a poly(lactide-co-glycolide) (PLGA) polymer having more than 30 mol % of lactide as described herein, and preferably having from 35 to 75 mol % lactide, and preferably from 38 to 70 mol % lactide, and more preferably from 40 to 60 mol % lactide, and more preferably from 45 to 55 mol % lactide. Preferably, said layer C comprises a PGA polymer and of a PLGA polymer having at most 30 mol % of lactide as described herein, wherein the weight ratio of PGA to PLGA is comprised between 40:60 and 60:40, and for instance is about 50:50.

In certain embodiments, a multilayer structure is provided comprising at least one barrier layer providing oxygen gas barrier properties, wherein said barrier layer comprises more than 90 wt %, and preferably from 95 to 100 wt % based on the total weight of the layer C, of a poly(lactide-co-glycolide) (PLGA) polymer having from 5 to 25 mol % lactide, and preferably from 5 to 15 mol % lactide, and more preferably from 9 to 14 mol % lactide.

In certain embodiments, a multilayer structure is provided, wherein said layer A comprises
  from 0 to 15 wt %, preferably from 0 to 10 wt % based on the total weight of the layer A of nucleating agent;
  from 0 to 25 wt %, preferably from 0 to 15 wt % based on the total weight of the layer A, of a non-PLA polymer, preferably selected from the group comprising preferably selected from the group comprising polycaprolactone (PCL), polybutylene succinate (PBS), polybutylene adipate (PBA), polybutylene succinate adipate (PBSA), polyhydroxyalkanoates (PHA), polybutylene adipate terephtalate (PBAT), thermoplastic starch (TPS) and non-thermoplastic starch (TPS), and
  from 75 to 100 wt %, preferably from 80 to 100 wt % based on the total weight of the layer A, of a polylactide (PLA) polymer as described herein, preferably selected from the group comprising poly(L-lactic acid) (PLLA), poly(D-lactic acid) (PDLA), poly(L-,D-lactic acid) (PLDLA), and any mixtures thereof;
said layer B comprises more than 75 to 100 wt %, and preferably from 80 to 100 wt % based on the total weight of the layer B of a poly(lactide-co-glycolide) (PLGA) polymer having from 38 to 70 mol % lactide, and preferably from 40 to 60 mol % lactide, and more preferably from 45 to 55 mol % lactide, and
said layer C comprises more than 90 wt %, and preferably from 95 to 100 wt % based on the total weight of the layer C, of a poly(lactide-co-glycolide) (PLGA) polymer having from 5 to 25 mol % lactide, and preferably from 5 to 15 mol % lactide, and more preferably from 9 to 14 mol % lactide.

Articles

Multilayer structures as described herein may be processed into articles. In certain embodiments, an article made from a multilayer structure as described herein is provided, wherein the article includes but is not limited to a film, a sheet, a laminate, which may be non-oriented, or, which may be uniaxially or biaxially oriented according to techniques well known to a skilled person. In certain embodiments such films include but are not limited to cast film, blown film, uniaxially or biaxially oriented film.

In certain embodiments, an article made a from a multilayer structure as described herein is provided, wherein the article includes but is not limited to a thermoformed article, an injection moulded article, an article made by injection stretch blow moulding, an article made by extrusion blow moulding, according to techniques well known to a skilled person.

Preferably an article as provided herein, includes but is not limited to a packaging material, such as a bag, a pouch, a container, a box, a cup, a tray, a bottle, a lidding film.

Preferred examples of articles according to the invention include thermoformed articles. A thermoforming process usually comprises
  (1) preheating the multilayer structure at an appropriate temperature,
  (2) applying vacuum, pressure and/or mechanical means to conform the heated structure to a mould,
  (3) cooling or crystallizing the article, usually by the mould surface,
  (4) removing the thermoformed article from the mould.

Producing a multilayer thermoformed article is a technology known per se. The thermoforming temperature, pressure and dwell time depend on the polymer combinations being used in the multilayer structure of the invention. One skilled in the art can select an appropriate temperature, pressure and dwell time for obtaining the thermoformed article from a multilayer structure according to the invention.

In certain embodiments, the thermoforming process involves the step of forming a multilayer structure according to the invention into an article using a cold mould, e.g. a mould operating at a temperature below 50° C., such as at a temperature of between 15 and 35° C.

In certain other embodiments, the thermoforming process involves the step of forming a multilayer structure according to the invention into an article using a hot old, e.g. a mould operating at a temperature above 50° C., such as at a temperature of between 75 and 125° C.

The invention will now be illustrated by the following, non-limiting illustrations of particular embodiments of the invention.

EXAMPLES

Materials

The following polymer and other materials were used in the examples.

Polymer "PLA1" is a PLDLA (having 96 wt % (isomeric purity) of L-lactide isomer) having a MFI (210° C., 2.16 kg) of 6 g/10 min and available from Total Corbion PLA, Gorinchem, The Netherlands, under the name Luminy PLA LX175.

Polymer "PLA2" is a PLLA (having more than 99 wt % (isomeric purity) of L-lactide isomer) having a MFI (210° C., 2.16 kg) of 23 g/10 min and available from Total Corbion PLA, Gorinchem, The Netherlands, under the name Luminy PLLA L130.

Polymer "PLA3" is a PLLA (having more than 99 wt % (isomeric purity) of L-lactide isomer) having a MFI (210° C., 2.16 kg) of 70 g/10 min and available from Total Corbion PLA, Gorinchem, The Netherlands, under the name Luminy PLLA L105.

"PLA4" is a PLA based composition comprising about 84 wt % of PLA (comprising about 79 wt % of PLLA Luminy L175 and 5 wt % of Luminy PDLA D070, both available from Total Corbion PLA, Gorinchem, The Netherlands), 1 wt % Talc (talc Mistron G7C) and 15 wt % of a mineral filler (Burgess Iceberg Kaolin), and having a MFI (210° C., 2.16 kg) of 5 g/10 min.

Polymer "PGA1" is a PGA having a MFI (230° C., 2.16 kg) of 24 g/10 min, and a MFI (250° C., 2.16 kg) of 53 g/10 min Polymer "PGA2" is a PGA available from Corbion, Gorinchem, The Netherlands, under the name Purasorb PG S.

Polymer "PLGA1" is PLGA having 10 mol % L-lactide and 90 mol % glycolide, having a MFI (205° C., 2.16 kg) of 40 g/10 min, and a MFI (210° C., 2.16 kg) of 47 g/10 min.

Polymer "PLGA2" is a PLGA having 50 mol % L-lactide and 50 mol % glycolide, having a MFI (170° C., 2.16 kg) of 15 g/10 min, and a MFI (175° C., 2.16 kg) of 12 g/10 min.

Polymer "PLGA3" is a PLGA having 10 mol % L-lactide and 90 mol % glycolide, available from Corbion, Gorinchem, The Netherlands, under the name Purasorb PLG 1017.

Polymer "PLGA4" is a PLGA having 50 mol % DL-lactide and 50 mol % glycolide, available from Corbion, Gorinchem, The Netherlands, under the name Purasorb PDLG 5010.

The material denoted as "BVE" is a barrier resin based on a vinyl alcohol resin, having a MFI (210° C., 2.16 kg) of about 3-5.5 g/10 min, and available from Nippon Gohsei, Dusseldorf, Germany, under the name G-polymer BVE-8049P".

The material denoted as "BTR" is an adhesive (tie) resin having a MFI (190° C., 2.16 kg) of 5 g/10 min available from Nippon Gohsei, Dusseldorf, Germany, under the name "BTR-8002P".

The material denoted as "J-MB" corresponds to a 25% Joncryl ADR4300 masterbatch (additive), available from Transmare Compounding BV, Roermond, the Netherlands, under the name "Bio 6LA-250CE00". Joncryl ADR4300 is a polymeric chain extender Analyses This section describes the analytical methods used to characterize the polymers as used herein, layers or multilayer sheets prepared with such polymers, and thermoformed articles prepared with multilayer sheets as disclosed hereunder.

Oxygen Transmission Rate (OTR) Measured on Films or Sheets

Oxygen Transmission Rate (OTR) was analysed in accordance with ASTM D3985-17 for analyses carried out under dry conditions (0% relative humidity). Oxygen Transmission Rate (OTR) was analysed in accordance with ASTM F1927-14 for all analyses carried out under conditions of a certain relative humidity (i.e. non dry conditions, conditions different from 0% relative humidity).

The relative humidity and temperature conditions applied during OTR measurements for sheets or multilayer sheets are specifically listed in examples 1 and 2 below. Film or sheet samples (see examples 1 and 2) were analysed for OTR in duplicate using appropriate equipment such as for instance a Mocon Ox-Tran 2/20 equipment. OTR measurements were done using a 100% oxygen concentration as permeant gas and with a maximal sample area (50 cm$^2$). OTR results were corrected with the individual zero values.

Oxygen Transmission Rate (OTR) Measured on Thermoformed Articles (Trays)

The OTR values of thermoformed articles, as discussed in the example 2, were analysed by standard methodology using appropriate equipment such as a Mocon Ox-tran Model 2/22 Oxygen Permeability and a Binder KBF 115 climate chamber in accordance with ASTM F-1307. Samples were glued gas tight onto a sample plate, which is placed in the climate chamber once the glue was dried. The climate chamber was set to the desired test temperature and relative humidity. The samples were purged one hour to remove all of the oxygen before the test started. OTR measurements were performed using a coulometric sensor, under temperature conditions of 23° C., using test gas at 21% oxygen conditions, 80% RH test gas, and 90% RH carrier gas.

Water Vapour Transmission Rate (WVTR) Measured on Films (Sheets)

The water vapour transmission rate (WVTR) was measured according to ASTM E96/E96M-16 (procedure: Water Method). Film samples were clamped between the lid and the bottom of a plastic dish (cup). The surface of the cups used was about 15.9 cm². A relative humidity of 100% was created inside the headspace of the cups. The relative humidity outside the cup was 11%, resulting in a relative humidity gradient between inside and outside of the cup of 89%. The cups were placed during the complete duration of the test within an environment wherein the temperature and the relative humidity were maintained to 38° C. and 10% respectively. During the test, the cups were placed in an exsiccator. Each cup was weighed a few times during the experiment. The weight loss measurement was used for the WVTR calculation.

Microscopy

Microscopy was used to identify layer thickness distribution of a multilayer structure (example 2 below) and to identify if the layer(s) remained intact after forming into an article. Samples of multilayer structures as discussed in example 2 were placed in a microtoming specimen mould, which was filled with liquefied paraffin. Once the paraffin was solidified, the sample was removed and cut with a microtome SLEE CUT 6062 in a SLEE MPS/P1 imbedding station.

The layer thicknesses in multilayer films were analysed by suitable equipement such as a Zeiss Axio Imager.Z2 Vario, microscope, equipped with a Zeiss SMC 2009 sample chamber and Axiocam MRc5 camera. To identify if a barrier layer was still intact after a thermoforming process, the thinnest area of the sample (thermoformed article) was located and layers were analysed by use of the microscope using either one of the below conditions. A skilled person can readily choose between the listed conditions, which light source is most suitable in order to distinguish the layers of a multilayer structure.

| Condition 1 | Condition 2 |
|---|---|
| Total magnification: 500 | Total magnification: 200 |
| Contrast method: Brightfield reflected light | Contrast method: Darkfield reflected light |
| Objective: EC Epiplan-Neofluar 50x/0.8 HD DIC | Objective: EC Epiplan-Neofluar 20x/0.5 HD DIC |

MFI

The melt flow index (MFI) can be determined according to ISO1133-A (2011). It is preferred that the polymers used in a multilayer structure as described herein have a similar MFI to ensure optimal processing and film/sheet quality.

EXAMPLES

Example 1: Barrier Properties of Sheets Comprising PLA, PGA or PLGA Polymer

In this example, the oxygen transmission rate (OTR) and water vapour transmission rate (VVVTR) of compression moulded sheets made of PLA, PGA or PLGA polymers was analysed. PLGA polymers with different compositions were applied in this example. The results of this example indicate that sheets comprising PGA and certain types of PLGA polymers provide barrier properties and are therefore particularly suitable for being applied in a barrier layer in a multilayer structure as described herein.

Preparation of the Samples by Compression Moulding

Sheets comprising polymers as listed in Table 1 were prepared. The polymer samples were pre-dried for a minimum of 4 hours at 85° C. in a Moretto desiccant hot air dryer with a dew point <−40° C.

Compression moulding was performed on a LabTech LP-S-50, 50 tons hydraulic press according the following procedure:
1. The polymer sample was weight, distributed in the mould and clamped between 2 steel plates of which the surface was covered with a glass filled Teflon liner to prevent sticking of the molten polymer to the steel plates.
2. The steel plates with samples were placed on a support located in between the upper and lower platens.
3. The upper and lower platens were nearly closed without applying pressure.
4. After the pre-heating time has elapsed, the platens were further closed and pressure 1 was applied.
5. After time 1 has elapsed, the platens were opened, which released the pressure for venting the sample.
6. After the venting time has elapsed, the platens were closed and pressure 2 was applied.
7. After time 2 has elapsed, the platens were opened and the steel plates with the mould was removed and quenched in a cold water bath to maintain the samples in an amorphous state. Compression moulding settings are reported in Table 1.

TABLE 1

| Polymer | Platens Temperature (° C.) | Pre-heating time (s) | Pressure 1 (kN) | Time 1 (s) | Venting time (s) | Pressure 2 (kN) | Time 2 (s) |
|---|---|---|---|---|---|---|---|
| PLA1 | 210 | 540 | 210 | 30 | 5 | 200 | 200 |
| PGA2 | 270 | 540 | 120 | 30 | 5 | 200 | 200 |
| PLGA3 | 250 | 540 | 120 | 30 | 5 | 200 | 200 |
| PLGA4 | 250 | 540 | 120 | 30 | 5 | 200 | 200 |

Sheets comprising the listed polymer samples were prepared by using a 100×100×0.21 mm square mould, which was laid between two 400×400 mm highly polished steel plates covered with glass fiber reinforced Teflon liner to avoid sticking of the PLA, PGA and PLGA polymers to the steel plates. All obtained sheets were transparent.

ORT Analyses

OTR of obtained sheets were measured according to the procedure as described in the analyses section above. Table 2a resumes the average OTR results as well as the standard error measured at 23° C. under dry conditions (0% RH) for the tested sheets. Table 2b resumes the average OTR result as well as the standard error measured at 23° C. at a higher relative humidity (85% RH).

TABLE 2a

OTR data as measured on sheets made from PLA, PGA and PLGA polymers (0% RH)

| Polymer in sheet | Thickness (µm) | OTR (mlO$_2$/m$^2$ · day · bar) [23° C., 0% RH, 100% O$_2$] | OTR corrected to 100 µm (mlO$_2$/m$^2$ · day · bar) [23° C., 0% RH, 100% O$_2$] |
|---|---|---|---|
| PLA1 | 254.6 ± 10.6 | 65.9 ± 0.2 | 167.7 ± 6.4 |
| PGA2 | 227.6 ± 7.4 | <0.042 ± 0.013 | <0.094 ± 0.026 |
| PLGA3 | 232.3 ± 6.4 | <0.081 ± 0.014 | <0.19 ± 0.03 |
| PLGA4 | 241.4 ± 0.8 | 6.4 ± 0.37 | 15.5 ± 0.95 |

TABLE 2b

OTR data as measured (85% RH) on a sheet made from a PLGA polymer

| Polymer in sheet | Thickness (µm) | OTR (mlO$_2$/m$^2$ · day · bar) [23° C., 85% RH, 100% O$_2$] | OTR corrected to 100 µm (mlO$_2$/m$^2$ · day · bar) [23° C., 85% RH, 100% O$_2$] |
|---|---|---|---|
| PLGA3 | 232.3 ± 6.4 | 0.66 ± 0.09 | 1.5 ± 0.2 |

FIG. 1 illustrates OTR values for the polymers reported in Table 2a, as corrected for a 100 µm sheet thickness, as a function of the percentage of glycolic acid in the applied polymers, and hence illustrates an effect of glycolide content on oxygen barrier properties. The obtained results indicate that varying, i.e. decreasing, the content of glycolic acid, i.e. increasing the lactide content, in the polymer used for preparing the sheets results in an increase in oxygen transmission through the sheet.

WVRT Analyses

WVTR of obtained sheets were measured in accordance with ASTM E96/E96M-16 (Procedure of Water Method) as described in the analyses section above. Samples of sheets made with PLA1, PGA2, PLGA3 and PLGA4 were measured in accordance with the Procedure for Water Method according to ASTM E96/E96M-16 (points 12.1 to 12.3). The sample indicated with PLGA3 was in addition also analysed by placing the cup in an inverted position in accordance with ASTM E96/E96M-16 (point 12.4). N refers to the number of replicates. Table 3 resumes the WVTR results as well the standard error measured at 38° C. for tested sheets made of PLA, PGA and PLGA polymers.

TABLE 3

| Polymer in sheet | Thickness (µm) | WVTR (g/m$^2$ · day) [38° C., 11-100% RH] | WVTR corrected to 100 µm (g/m$^2$ · day) [38° C., 11-100% RH] |
|---|---|---|---|
| WVTR results according to ASTM E96/E96M (N = 3) | | | |
| PLA1 | 248.5 ± 11.3 | 41.2 ± 1.6 | 102.3 ± 1.5 |
| PGA2 | 236.6 ± 2.5 | 12.2 ± 0.1 | 28.8 ± 0.5 |
| PLGA3 | 228.7 ± 2.5 | 18.4 ± 1.8 | 42.0 ± 3.2 |
| PLGA4 | 240.9 ± 12.6 | 27.6 ± 2.2 | 66.3 ± 5.2 |
| WTR results according to ASTM E96/E96M with cup in inverted position (N = 2) | | | |
| PLGA3 | 233.0 ± 8.8 | 18.6 ± 1 | 43.4 ± 3.9 |

FIG. 2 illustrates WVTR values, as corrected for a 100 µm sheet thickness, as a function of the percentage of glycolic acid in the polymers reported in Table 3 (ASTM E96/E96M (N=3) water method). This figure illustrates an effect of glycolide content on WVTR properties. The obtained results indicate that by varying, i.e. decreasing the content of glycolic acid, i.e. increasing the lactide content, in the polymer used for preparing the sheets results in an increase in water vapour transmission through the sheet.

Summarised, this example illustrates that a film or sheet (layer) based on PGA or PLGA polymer shows better oxygen barrier and water vapour barrier properties than a film or sheet based on PLA, and a film or sheet (layer) based on PGA or on PLGA polymer rich in glycolide provides good oxygen barrier and water vapour barrier properties.

Example 2: Multilayer Sheets and Articles Made Therefrom

The following example illustrates different multilayer structures (sheets) according to the invention and comparative examples of multilayer sheets, obtained by extrusion.

The obtained multilayer sheets were analysed for their layer thickness distribution by microscopy and for their oxygen barrier properties using the methods as explained above in the analysis section.

The obtained sheets were then formed into articles, in particular into trays, by a thermoforming process. A tray as used in the present example is illustrated on FIGS. 3A-C. The cavity of the tray as used in the present example was 147×77 mm (A×B on FIG. 3A) with drawing depth of 41 mm (C on FIG. 3B). The thermoforming process was monitored and the obtained articles were analysed with microscopy using the method as explained above in the analysis section to identify the effect of the thermoforming process onto the layers of the multilayer sheets used.

The thermoformed trays were evaluated for their oxygen barrier properties.

The thermoformed trays were also evaluated for resistance to heat by means of measuring resistance against boiling water. Articles which are not resistant to boiling water will shrink significantly when exposed to temperatures above the glass transition temperature of the base layer. Articles which are resistant to boiling water will not shrink when exposed to temperatures above the glass transition temperature of the base layer and remain their shape. Resistance to boiling water is tested by adding boiling water (e.g. from a water cooker) into the thermoformed article. If heat resistance is achieved, the article will remain its shape. When not heat resistant it loses shape and shrinks significantly.

Overall, the examples reported below show that a multilayer structure according to the invention, as compared to comparative multi-layer structures:
- is easy to process into a multilayer structure with good visual quality, which means e.g. the generation of a minimum number of gels and flow lines;
- has excellent OTR properties;
- provides a good adhesion between the layers of the structure, thus significantly reducing delamination into separate layers; and
- can be thermoformed into a product or article, without significantly affecting the structure and/or properties of the layers.

(a) Preparation of Multilayer Sheets by Means of Sheet Extrusion

Table 4 lists polymers as applied in the multilayer sheets illustrated in this example and their drying conditions. Drying was performed in a desiccant hot air drier with a dew point lower than −40° C.

TABLE 4

| Polymer | Drying conditions |
|---|---|
| PLA1 | >4 hrs at 85° C. |
| PLA2 | >4 hrs at 85° C. |
| PLA3 | >4 hrs at 85° C. |
| PLA4 | >4 hrs at 85° C. |
| PGA1 | >4 hrs at 85° C. |
| PLGA1 | >4 hrs at 85° C. |
| PLGA2 | >overnight at 40° C. |
| J-MB | not dried |
| BTR | not dried |
| BVE | not dried |

Multilayer sheet extrusion was performed on a Collin multi-layer sheet extrusion line, using one Collin 25 mm single screw extruder (E25M) and two Collin 20 mm single screw extruders (E20TH), according to methods well known by a skilled person. The die block was set-up for running a 5 layer structure (A/B/C/B/A). The 25 mm extruder feeds the A layer and the B and C layer were fed by the 20 mm extruders. The sheet was cast onto a temperature controlled vertical 3 stack roll system and wound into a reel.

All extruded multilayer sheets in this example comprised at least one a bulk layer (base layer) comprising PLA (layer A), at least one tie layer (layer B), and at least one a barrier layer (layer C). Thicknesses of the different layers of the sheet are available in Table 12.

Table 5 shows different examples of multilayer sheets which were extruded and the composition of each of the layers. In general the functionality of the different layers can be characterized as shown in the overview below.
- A-layer: Outer bulk layer
- B-layer: Tie layer
- C-Layer: Barrier layer
- Structure: A/B/C/B/A

TABLE 5

Multilayer sheets with indication of polymers used in the different layers

| Example | A | B | C |
|---|---|---|---|
| 1 | PLA1 | PGA1 (*) | PLA1 |
| 2 | PLA1 | BTR | BVE |
| 3 | PLA1 | BTR | PGA1 (*) |
| 4 | PLA4 | BTR | BVE |
| 5 | PLA4 | BTR | PGA1 (*) |
| 6 | PLA1 | PLGA2 (**) | PLA1 |
| 7 | PLA1 | PLGA2 () | PLGA1 () |
| 8 | PLA3 | PLA3 | PLGA1 (**) |
| 9 | PLA3 | PLGA2 () | PLGA1 () |
| 10 | PLA2 | PLGA2 () | PLGA1 () |
| 11 | PLA4 | PLGA2 () | PLGA1 () |

(*) indicates that the layer comprises 4% by weight (based on the total amount of the components in the layer, i.e. polymer and additive) of J-MB;

(**) indicates that the layer comprises 5% by weight (based on the total amount of the components in the layer, i.e. polymer and additive) of J-MB;

Examples 1 to 5 and 8 do not contain PLGA in the tie (B) layer. Examples 1, 2, 4 and 6 do not contain PGA and/or PGLA polymer in the barrier (C) layer.

Extrusion temperature settings are listed in Table 6, while the screw speed, chill roll speed and extruder readings are listed in Tables 7a-b.

TABLE 6

Temperature settings (in ° C.) during multilayer sheet extrusion

| | Temperature (° C.) | | | | |
|---|---|---|---|---|---|
| Example | Extruder A | Extruder B | Extruder C | die | chill roll |
| 1 | 35-180-190-210-220-220 | 225-230-235-235 | 215-220-225-225 | 225-225-225-225-225 | 35 |
| 2 | 35-175-185-195-195-195 | 225-230-235-235 | 225-230-235-235 | 210-210-210-210-210 | 35 |
| 3 | 35-175-185-195-195-195 | 225-230-235-235 | 220-230-235-240 | 225-225-225-225-225 | 25 |
| 4 | 35-175-190-205-205-205 | 225-230-235-235 | 225-230-235-235 | 220-220-220-220-220 | 50 |
| 5 | 35-175-190-205-205-205 | 225-230-235-235 | 220-230-235-240 | 225-225-225-225-225 | 25 |
| 6 | 30-190-200-215-215-216 | 160-165-160-160 | 205-220-215-210 | 200-200-200-200-200 | 50 |
| 7 | 30-190-200-215-213-215 | 165-165-160-160 | 220-230-220-215 | 190-190-190-200-200 | 50 |
| 8 | 30-185-195-200-200-200 | 205-210-200-200 | 220-225-215-215 | 220-220-210-210-210 | 53 |
| 9 | 30-183-183-185-185-188 | 170-175-185-185 | 220-220-210-210 | 210-210-210-210-210 | 53 |
| 10 | 30-183-183-185-185-188 | 170-175-185-185 | 220-220-210-210 | 210-210-210-210-210 | 52 |

TABLE 6-continued

Temperature settings (in ° C.) during multilayer sheet extrusion

| Example | Extruder A | Extruder B | Extruder C | die | Temperature (° C.) chill roll |
|---|---|---|---|---|---|
| 11 | 30-195-205-215-220-220 | 170-175-185-185 | 220-220-210-210 | 210-210-210-210-210 | 55 |

TABLE 7a

Extruder settings during multilayer sheet extrusion

| | Screw speed (rpm) | | | speed chill roll |
|---|---|---|---|---|
| Example | Extruder A | Extruder B | Extruder C | (m/min) |
| 1 | 40 | 10 | 100 | 1.3 |
| 2 | 60 | 10 | 10 | 1 |
| 3 | 60 | 15 | 15 | 1.2 |
| 4 | 60 | 10 | 10 | 1.1 |
| 5 | 60 | 15 | 15 | 1 |
| 6 | 65 | 11.5 | 10 | 0.8 |
| 7 | 67 | 14 | 8 | 0.8 |
| 8 | 70 | 15 | 6 | 1 |
| 9 | 70 | 20 | 6 | 1 |
| 10 | 70 | 20 | 6 | 0.9 |
| 11 | 70 | 20 | 6 | 0.8 |

TABLE 7b

Extruder settings during multilayer sheet extrusion (continued)

| | Mass temperature (° C.) | | | Pressure (bar) | | |
|---|---|---|---|---|---|---|
| Example | Extruder A | Extruder B | Extruder C | Extruder A | Extruder B | Extruder C |
| 1 | 213 | 220 | 203 | 37 | 23 | 95 |
| 2 | 188 | 221 | 211 | 87 | 58 | 50 |
| 3 | 188 | 221 | 212 | 72 | 47 | 82 |
| 4 | 198 | 220 | 212 | 119 | 45 | 94 |
| 5 | 198 | 221 | 212 | 114 | 55 | 101 |
| 6 | 206 | 145 | 202 | 100 | 63 | 59 |
| 7 | 205 | 145 | 194 | 121 | 82 | 50 |
| 8 | 194 | 188 | 202 | 16 | 10 | 18 |
| 9 | 194 | 168 | 196 | 16 | 25 | 7 |
| 10 | 190 | 169 | 196 | 60 | 34 | 18 |
| 11 | 208 | 169 | 196 | 86 | 66 | 42 |

The quality and transparency of the extruded sheets as prepared above was visually evaluated and adhesion of the layers of the different sheets was tested by trying to separate the layers manually by hand. Results are listed in Table 8.

TABLE 8

Evaluation of multilayer sheets

| | Visual observations | |
|---|---|---|
| Example | delamination | Transparent (*) |
| 1 | easy | yes |
| 2 | not possible | yes |
| 3 | easy | yes |
| 4 | not possible | no |
| 5 | easy | no |
| 6 | not possible | yes |
| 7 | not possible | yes |
| 8 | easy | yes |
| 9 | not possible | yes |
| 10 | not possible | yes |
| 11 | not possible | no |

(*) "yes" means one can look through the sheet; "no" means one cannot look through the sheet.

From the results it follows that good binding properties can be observed in examples 6-7, and 9-11 in which the tie layer contains a PLGA polymer according to the invention. In multilayer structures 2 and 4, the adhesive resins used in the tie layer provide binding to the vinyl alcohol based barrier resin.

OTR values of a number of multilayer sheets were measured at 23° C., using 100% oxygen conditions at a relative humidity of 0, 35, 50, 75 or 78% RH, to identify the effect of the relative humidity on the oxygen barrier properties. An overview of the results is listed in Table 9. OTR values were determined as explained in the "Analyses" section above.

TABLE 9

OTR values [ml O$_2$/m$^2$ · day · bar at 23° C.] at 100% O$_2$ and as measured at different relative humidity conditions on multilayer sheets.

| | Relative humidity (% RH) | | | | |
|---|---|---|---|---|---|
| Example | 0 | 35 | 50 | 75 | 78 |
| 2 | <0.1 | <0.1 | 0.1 | 3.2 | nd |
| 10 | 1.8 | 1.7 | 2.1 | nd | 3.4 |
| 11 | 1.6 | 1.5 | 1.9 | nd | 2.9 |

"nd" = not determined

The illustrated values indicate that oxygen barrier properties of a multilayer structure according to the invention (examples 10 and 11) remain relatively stable, also under higher relative humidity, as compared to a multilayer structure having a barrier layer comprising a vinyl alcohol resin, which shows a steep increase in oxygen gas permeation under higher relative humidity conditions (example 2; steep increase when comparing values at 0-50% RH and 75% RH).

(b) Preparation of Thermoformed Articles

Thermoformed articles were made from a number of multilayer sheets as prepared above.

Table 10 lists the selected sheets and the thermoforming conditions applied. The listed sheets were thermoformed into trays using an Illig single sheet thermoformer equipped with ceramic top and bottom heaters, plug assist, positive pressure up to 7 bar and an electrically heated mould. References a and b used in Table 10 mean that the same sample has been processed using two different processing conditions, in particular two different mould temperatures. Examples "a" were preparing using a "cold" mould, while "b" samples were prepared are using a "hot" mould.

TABLE 10

Thermoforming settings as applied to multilayer sheets

| Example | $T_{heaters}$ (° C.) | $t_{heating}$ (s) | $P_{air}$ (bar) | $T_{mould}$ (° C.) | $t_{cooling}$ (s) |
|---|---|---|---|---|---|
| 2 | 325 | 12 | 7 | 40 | 20 |
| 3 | 325 | 9 | 7 | 40 | 20 |
| 4-a | 325 | 12 | 7 | 40 | 20 |
| 4-b | 325 | 12 | 7 | 85 | 20 |
| 5-a | 325 | 12 | 7 | 40 | 20 |
| 5-b | 325 | 12 | 7 | 90 | 20 |
| 10-a | 325 | 12 | 7 | 25 | 20 |
| 10-b | 450 | 12 | 7 | 90 | 20 |
| 11-a | 325 | 12 | 7 | 25 | 20 |
| 11-b | 450 | 12 | 7 | 90 | 20 |

Thermoformed trays were analysed for their resistance to boiling water as explained in the analyses section. Boiling water was poured in the tested thermoformed tray. If the tray kept its shape it was classified as "y"; while if it shrunk and lost shape it was classified as a "n". Results thereof are reported in Table 11.

TABLE 11

| Example | Boiling water resistance |
|---|---|
| 2 | n |
| 3 | n |
| 4-a | n |
| 4-b | y |
| 5-a | n |
| 5-b | y |
| 10-a | n |
| 11-a | n |
| 11-b | y |

Results in Table 11 show that increasing the mould temperature causes the applied PLA compound to be crystallized into heat stable articles, e.g. articles that are resistance towards boiling water.

Microscopy was also used to identify the layer thickness distribution and to check if the layers applied in the multilayer structure remained intact after thermoforming. Microscopic analysis was performed as explained under the "analyses" section above. Results of the analyses are reported in Table 12. In the table, the term "flat bottom" refers to the thickness of the layers in the bottom of the tray, which was stretched to a certain degree. The term "flange" refers to sheet thickness at the top of the tray, which was clamped between the mould and therefore not stretched.

TABLE 12

| | Thickness of the layer (flat bottom, μm) | | | | | | Thickness of the layer (flange, μm) | | | | | |
|---|---|---|---|---|---|---|---|---|---|---|---|---|
| example | A | B | C | B | A | Total | A | B | C | B | A | Total |
| 2 | 79.2 | 10.1 | 17.9 | 9.8 | 80.5 | 198 | 135.3 | 16.5 | 38.5 | 16.2 | 138.7 | 335 |
| 3 | 61.5 | 8.4 | 17.9 | 9.4 | 69.8 | 166 | nd | nd | nd | nd | nd | nd |
| 4-a | 69.1 | 8.4 | 16.9 | 9.7 | 67.4 | 171 | nd | nd | nd | nd | nd | nd |
| 4-b | 73.1 | 9.3 | 18.5 | 10.4 | 75.8 | 186 | nd | nd | nd | nd | nd | nd |
| 5-a | 75.2 | 14 | 22.8 | 8.8 | 72.6 | 193 | nd | nd | nd | nd | nd | nd |
| 5-b | 87.3 | 17.5 | 16.4 | 16.3 | 85.7 | 222 | nd | nd | nd | nd | nd | nd |
| 10-a | nd | nd | nd | nd | nd | nd | 193.5 | 24.2 | 18.4 | 23.9 | 197.1 | 458 |
| 11-b | nd | nd | nd | nd | nd | nd | 225.7 | 21.1 | 28.4 | 26.5 | 234.8 | 538 |
| 11-b | nd | nd | nd | nd | nd | nd | 241 | 24.3 | 16.6 | 21.7 | 234.2 | 539 |

"nd" = not determined

OTR values were measured for a number of thermoformed trays. Measurements were carried out at the conditions specified in Table 13 as explained in the "Analyses" section above. OTR measurements were performed at 23° C., using 21% oxygen conditions. Results of OTR values measured on thermoformed articles are reported in Table 13.

TABLE 13

| Example | OTR 21% $O_2$<br>80% RH test gas-90% RH carrier gas<br>[cc O2/kg · day at 23° C.] |
|---|---|
| 2 | 0.0721 |
| 3 | 0.0072 |
| 4-a | 0.0766 |
| 4-b | 0.0784 |
| 5-a | 0.0070 |
| 5-b | 0.0055 |
| 10-a | 0.0494 |
| 11-a | 0.0362 |
| 11-b | 0.0354 |

Results in Table 13 show that good oxygen barrier properties are obtained for articles made from sheets according to the invention.

Summarised, this example illustrates that a film or sheet (layer) based on PLA may advantageously be bonded to PGA or to a glycolide-rich PLGA polymer as defined by means of a tie layer comprising a lactide-rich PLGA polymer as defined herein.

A tie layer comprising or made of a lactide-rich PLGA polymer as defined herein is particularly advantageous for forming a firm bond between a PLA based layer and a glycolide-rich PLGA based layer as described herein. A lactide-rich PLGA polymer as described herein can thus advantageously be used as a tie resin in a PLA/PGA polymer multilayer structure.

The example further illustrates that a lactide-rich PLGA polymer as defined herein provides better bonding properties than comparative tie resins (such as e.g. BTR).

The examples further illustrate that highly transparent articles for cold applications, e.g. with a maximum usage temperature of 45° C., with good oxygen barrier properties can be obtained when such articles are formed in a cold mould (e.g. temperature up to 50° C.), and are made from a multilayer structure comprising at least a first base layer comprising a PLA polymer resin, at least a second tie layer comprising a lactide-rich PLGA polymer as defined herein, for instance a PLGA having about equimolar amounts of lactide and glycolide, and a third barrier layer comprising a PGA or PLGA polymer rich in glycolide as defined herein (for instance a PLGA with 90:10 glycolide-lactide molar ratio).

The present invention also shows that heat resistant articles withstanding temperature significantly above the glass transition temperature of PLA, with good oxygen barrier properties can be obtained when such articles are formed in a heated mould (e.g. temperatures of 75-135° C.), and are made from a multilayer structure comprising at least a first base layer comprising a PLA polymer and a nucleating agent, at least a second tie layer comprising a lactide-rich PLGA polymer as defined herein, in particular a PLGA having about equimolar amounts of lactide and glycolide, and a third barrier layer comprising a PGA or glycolide-rich PLGA as defined herein, for instance a PLGA with 90:10 glycolide-lactide molar ratio.

The invention claimed is:

1. A multilayer structure comprising at least three different layers A, B and C,
   wherein the layer B is disposed between the layer A and the layer C and is capable of binding the layer A to the layer C, and wherein
   the layer A comprises a polylactide (PLA) polymer and optionally a nucleating agent,
   the layer B comprises a poly(lactide-co-glycolide) (PLGA) polymer having more than 30 mol % of lactide, and
   the layer C comprises a poly(lactide-co-glycolide) (PLGA) polymer having from 2 to 30 mol % of lactide.

2. The multilayer structure according to claim 1, wherein the layer A comprises from 50 to 100 wt % of a PLA polymer.

3. The multilayer structure according to claim 1, wherein the PLA polymer is a polymer of a lactide monomer, wherein the lactide monomer is selected from the group consisting of L-lactide, D-lactide, meso-lactide, and any mixtures thereof.

4. The multilayer structure according to claim 1, wherein the PLA polymer is selected from the group consisting of poly(L-lactic acid) (PLLA), poly(D-lactic acid) (PDLA), poly(L-,D-lactic acid) (PLDLA), and any mixtures thereof.

5. The multilayer structure according to claim 1, wherein the PLA polymer is a PLA copolymer of lactide monomer and a non-lactide comonomer selected from the group consisting of urethanes, carbonates and lactones.

6. The multilayer structure according to claim 1, wherein the layer A further comprises one or more polymers different from PLA, and selected from the group consisting of polycaprolactone (PCL), polybutylene succinate (PBS), polybutylene adipate (PBA), polybutylene succinate adipate (PBSA), polyhydroxyalkanoates (PHA), polybutylene adipate terephtalate (PBAT), thermoplastic starch (TPS) and non-thermoplastic starch (TPS).

7. The multilayer structure according to claim 1, wherein the layer A comprises up to 15 wt % of a nucleating agent.

8. The multilayer structure according to claim 1, wherein the layer B comprises from 50 to 100 wt % of the PLGA polymer.

9. The multilayer structure according to claim 1, wherein the layer B comprises a PLGA polymer having from 35 to 75 mol % lactide.

10. The multilayer structure according to claim 1, wherein the layer C comprises from 40 to 100 wt %, of the PLGA polymer.

11. The multilayer structure according to claim 1, wherein the layer C comprises a PLGA polymer having from 5 to 25 mol % lactide.

12. The multilayer structure according to claim 1, wherein the layer C is a barrier layer providing oxygen gas barrier properties.

13. The multilayer structure according to claim 1, wherein all layers in the structure are compostable or chemically recyclable.

14. An article made from a multilayer structure comprising at least three different layers A, B and C,
   wherein the layer B is disposed between the layer A and the layer C and is capable of binding the layer A to the layer C, and wherein
   the layer A comprises a polylactide (PLA) polymer and optionally a nucleating agent, the layer B comprises a poly(lactide-co-glycolide) (PLGA) polymer having more than 30 mol % of lactide, and the layer C comprises a poly(lactide-co-glycolide) (PLGA) polymer having from 2 to 30 mol % of lactide.

15. The article according to claim 14, wherein the article is selected from the group consisting of a film, a sheet, and a laminate, and is a blown film, a cast film, or an uniaxially oriented or biaxially oriented film.

16. The article according to claim 14, wherein the article is a thermoformed article, an injection moulded article, an article made by injection stretch blow moulding, an article made by extrusion blow moulding.

* * * * *